(12) United States Patent
Roy

(10) Patent No.: US 12,231,944 B2
(45) Date of Patent: Feb. 18, 2025

(54) SYSTEM AND METHODS FOR PROVIDING INTEGRATED 5G AND SATELLITE SERVICE IN BACKHAUL AND EDGE COMPUTING APPLICATIONS

(71) Applicant: HUGHES NETWORK SYSTEMS, LLC, Germantown, MD (US)

(72) Inventor: Satyajit Roy, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 321 days.

(21) Appl. No.: 17/576,079

(22) Filed: Jan. 14, 2022

(65) Prior Publication Data

US 2023/0032024 A1    Feb. 2, 2023

Related U.S. Application Data

(60) Provisional application No. 63/227,802, filed on Jul. 30, 2021.

(51) Int. Cl.
*H04W 28/02* (2009.01)
*H04W 24/08* (2009.01)
*H04W 84/06* (2009.01)
*H04W 88/16* (2009.01)

(52) U.S. Cl.
CPC ....... *H04W 28/0231* (2013.01); *H04W 24/08* (2013.01); *H04W 84/06* (2013.01); *H04W 88/16* (2013.01)

(58) Field of Classification Search
CPC .............. H04B 7/18513; H04W 24/08; H04W 28/0231; H04W 84/06; H04W 88/16; H04L 69/166; H04L 1/0007; H04L 1/0015; H04L 1/0001; H04L 1/1841; H04L 47/34; H04L 1/0035; H04L 1/0026; H04L 45/24; H04L 47/43; H04L 47/22; H04L 47/283; H04L 49/90; H04L 49/9094; H04L 2212/00; H04L 45/243; H04L 45/22; H04L 45/10; H04L 43/091; H04L 43/0829; H04L 41/5009; H04L 41/06; H04L 47/263; H04L 47/2441; H04L 47/27; H04L 47/32; H04L 47/822; H04L 51/58

See application file for complete search history.

(56) References Cited

U.S. PATENT DOCUMENTS 8,233,502 B2 *  7/2012  Venkatesan ............. H04L 45/24
                                                               370/476
11,201,780 B2 * 12/2021  Yu .......................... H04W 76/27
(Continued)

*Primary Examiner* — Wutchung Chu
(74) *Attorney, Agent, or Firm* — Potomac Technology Law, LLC

(57) ABSTRACT

A system and method for integrating 5g and satellite services. A data stream is received from a first network, and traffic conditions in the first network and a plurality of second networks are analyzed. The data stream is segmented into a first portion and at least one second portion based on the analysis of the traffic conditions, and transmitted over the plurality of second networks. The first portion of the data stream and the second portions of the data stream are received at a destination. The first portion of the data stream and the second portions of the data stream are subsequently reassembled, using reassembly information, to reproduce the data stream received from the first network.

18 Claims, 11 Drawing Sheets

(56) References Cited

U.S. PATENT DOCUMENTS

| | | | |
|---|---|---|---|
| 2003/0081582 A1* | 5/2003 | Jain | H04W 8/265 370/352 |
| 2008/0056192 A1* | 3/2008 | Strong | H04L 47/56 370/331 |
| 2008/0056295 A1* | 3/2008 | Loda | H04L 47/2441 370/437 |
| 2009/0067328 A1* | 3/2009 | Morris | H04W 72/569 370/230.1 |
| 2009/0074012 A1* | 3/2009 | Shaffer | H04L 47/283 370/516 |
| 2009/0122753 A1* | 5/2009 | Hughes | H04W 40/16 370/329 |
| 2016/0112308 A1* | 4/2016 | Ficara | H04L 12/417 370/401 |
| 2017/0105142 A1* | 4/2017 | Hecht | H04B 7/185 |
| 2017/0230105 A1* | 8/2017 | Baudoin | H04B 7/18521 |
| 2018/0019939 A1* | 1/2018 | Finkelstein | H04L 12/66 |
| 2019/0104458 A1* | 4/2019 | Svennebring | H04L 45/42 |
| 2020/0112363 A1* | 4/2020 | Roy | H04W 40/12 |
| 2020/0412659 A1* | 12/2020 | Arditti Ilitzky | H04L 43/087 |
| 2021/0058748 A1* | 2/2021 | Liao | H04W 76/11 |
| 2021/0075697 A1* | 3/2021 | Dattagupta | H04L 41/5019 |
| 2021/0250281 A1* | 8/2021 | Li | H04L 45/302 |
| 2021/0385169 A1* | 12/2021 | Urman | H04L 1/08 |
| 2022/0158897 A1* | 5/2022 | Chou | H04L 41/082 |
| 2023/0042752 A1* | 2/2023 | Jin | H04W 52/365 |

* cited by examiner

SYSTEM AND METHODS FOR PROVIDING INTEGRATED 5G AND SATELLITE SERVICE IN BACKHAUL AND EDGE COMPUTING APPLICATIONS

CROSS-REFERENCE TO RELATED APPLICATION

The present application claims priority to U.S. Provisional Patent Application No. 63/227,802, and entitled "SYSTEM AND METHODS FOR PROVIDING INTEGRATED 5G AND SATELLITE SERVICE IN BACKHAUL AND EDGE COMPUTING APPLICATIONS", the entire disclosure of which is incorporated herein by reference.

BACKGROUND INFORMATION

Modern communication technologies have enabled delivery of multimedia services (e.g., voice, data, video, etc.) to end-users over various delivery platforms, including terrestrial wire-line, fiber and wireless communications and networking technologies, and satellite communications and networking technologies. Satellite networks have emerged as an option for consumers to access data, as well as voice, networks. Satellite networks typically employ one or more gateways (or satellite hubs) to provide service to customers utilizing very small aperture terminals (VSATs). The VSATs can be located within a multiplicity of user spot beams (or spot beams). Each gateway is communicatively connected to a designated set of user spot beams by means of a satellite. Each gateway is situated in a gateway spot beam (or gateway beam), and generally only a single gateway beam is connected to a specific spot beam. The gateway beams are distributed across an area so as to enable reuse of feeder link spectrum between gateways, thereby maximizing gateway (and system) capacity.

Satellite networks can also utilize various types of satellite terminals (or simply "terminals"), including fixed, portable, transportable, etc., to establish communication over the satellite network. The terminal allows a consumer to access, for example, data networks via multiple user devices. The terminal is associated with a gateway which provides a point of connection to terrestrial data networks for the satellite network.

Developments in communication technologies, such as the 5th generation of communication system (5G), have resulted in increased speed and capacity. This has also resulted in an increased availability for enhanced multimedia services. For example, 5G networks allow consumers to access Enhanced Mobile Broadband (eMBB) applications such as 4K and 8K video streaming, virtual and augmented reality applications, etc. When utilizing such applications, 5G networks can ensure a Quality-of-Experience (QoE) for users in dynamic and challenging network scenarios. As the deployment of 5G terrestrial networks continues, it would be beneficial to integrate 5G terrestrial networks with satellite networks to improve fronthaul, backhaul, and edge computing services. For example, such integration can take advantage of unique capabilities of satellite networks such as wide coverage, ubiquity, reliability, security, and multicast/broadcast capability.

BRIEF SUMMARY

A method and system are disclosed for providing integrated 5g and satellite service in backhaul and edge computing applications. According to an embodiment, the method includes: receiving a data stream from a first network; analyzing traffic conditions in the first network and a plurality of second networks; segmenting the data stream into a first portion and at least one second portion based on the analysis of the traffic conditions; generating reassembly information for the first portion of the data stream and the at least one second portion of the data stream; transmitting the first portion of the data stream, the at least one second portion of the data stream, and the reassembly information over the plurality of second networks; receiving the reassembly information at a destination via one of the plurality of second networks; receiving the first portion of the data stream and the at least one second portion of the data stream at the destination via the plurality of second networks; reassembling the first portion and the at least one second portion of the data stream, based on the received reassembly information, to reproduce the data stream received from the first network; and providing the reassembled data stream via the first network.

According to another embodiment, the system includes: a plurality of network nodes of a first network; a gateway configured to establish a communication link with one of the plurality of network nodes; and a terminal configured to establish a communication link with the gateway over a plurality of second networks. The gateway is further configured to: receive a data stream from the one of the plurality of network nodes in the first network; analyze a traffic condition in the first network and the plurality of second networks; segment the data stream into a first portion and at least one second portion based on the analysis of the at least one traffic condition; generate reassembly information for the first portion of the data stream and the at least one second portion of the data stream; and transmit the first portion of the data stream, the at least one second portion of the data stream, and the reassembly information over the plurality of second networks. The terminal is further configured to: receive the reassembly information at a destination via one of the plurality of second networks; receive the first portion of the data stream and the at least one second portion of the data stream at the destination via the plurality of second networks; reassemble the first portion and the at least one second portion of the data stream, based on the received reassembly information, to reproduce the data stream received by the gateway from the first network; and provide the reassembled data stream via a different one of the connecting nodes in the first network.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for providing integrated 5g and satellite service in backhaul and edge computing applications are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
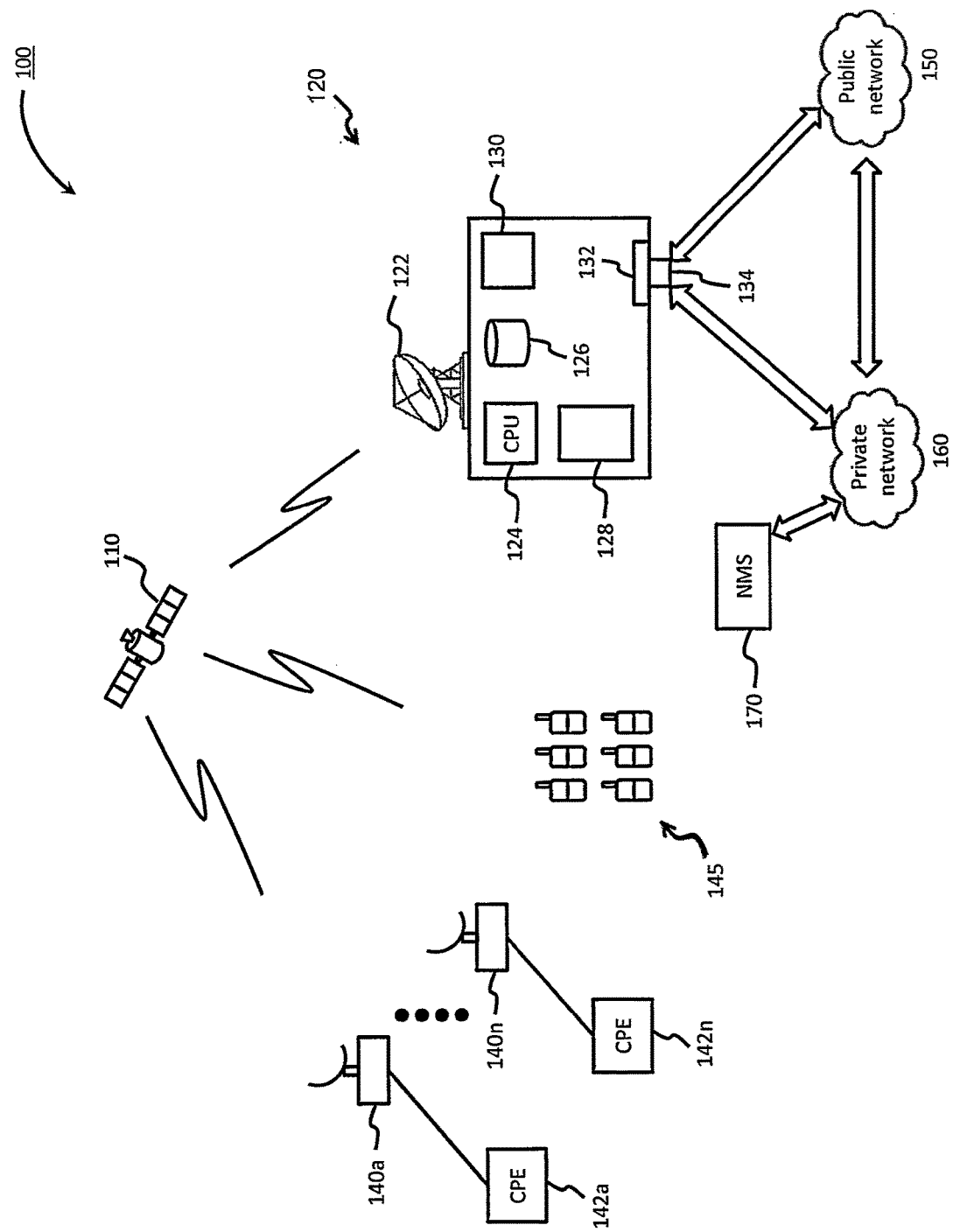
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication which can also be supported by the terminal 140. Connected appliances can include, without limitation, televisions, home assistants, thermostats, refrigerators, ovens, etc. The network of such devices is commonly referred to as the internet of things (IoT).

According to an exemplary embodiment, the terminals 140a-n can be in the form of very small aperture terminals (VSATs) that are mounted on a structure, habitat, etc. Depending on the specific application, however, the terminals 140a-n can incorporate an antenna dish of different sizes (e.g., small, medium, large, etc.). The terminals 140a-n typically remain in the same location once mounted, unless otherwise removed from the mounting. According to various embodiments, the terminals 140a-n can be mounted on mobile platforms that facilitate transportation thereof from one location to another. Such mobile platforms can include, for example, cars, buses, boats, planes, etc. The terminals 140a-n can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal can be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate CPE 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver (RFT) 122, a processing unit (or computer, CPU, etc.) 124, and a data storage unit (or storage unit) 126. While generically illustrated, the processing unit 124 can encompass various configurations including, without limitations, a personal computer, laptop, server, etc. As used herein, a transceiver corresponds to any type of antenna unit used to transmit and receive signals, a transmitter, a receiver, etc. The RFT 122 is usable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system (NMS) 170. The NMS 170 maintains, in part, information (e.g., configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Each terminal 140a-n can be configured for relaying traffic between its customer CPEs 140a-140n, a public network 150 such as the Internet, and/or its private network 160 across the satellite link and through gateway 120. The gateway 120 can be configured to route this traffic across the public network 150 and private network 160 as appropriate. The gateway 120 can be further configured to route traffic from the public 150 Internet and private network 160 across the satellite link to the appropriate terminal 140. The terminal 140 then routes the traffic to the appropriate CPE 140.

As illustrated in FIG. 1, the satellite communication system 100 facilitates communication between a satellite network, public networks 150, and private networks 160. Various embodiments, however, can also be configured for providing communication within only a terrestrial network (e.g., public communication networks 150 and private communication networks 160), or within only a satellite network. Thus, while FIG. 1 only illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
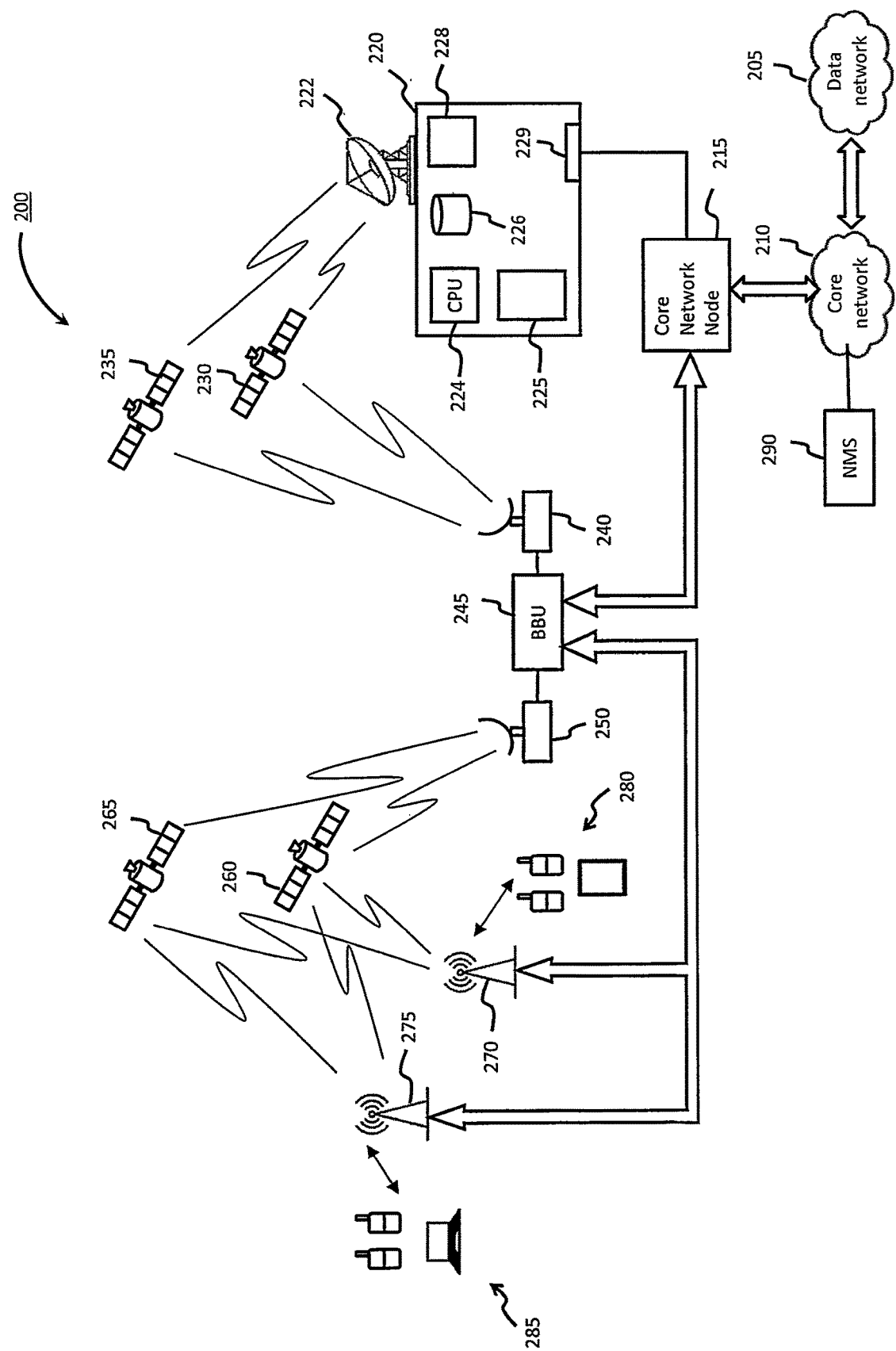
FIG. 2 is a diagram of a system that combines both a core network and a satellite network for communication, according to one or more embodiments.

FIG. 2 is a diagram of an exemplary communication system 200 that combines both a core network and a satellite network for communication, according to one or more embodiments. The data network 205 operates in a manner similar to public network 150. In some embodiments, the data network 205 can be the internet. In some embodiments, the core network can be owned and/or operated as a private network, such as private network 160. According to the illustrated embodiment, the core network 210 can use one or more terrestrial wired or wireless communication media, such as fiber optical line, telephone line, coaxial cable, and/or cellular radio. The core network 210 can further provide communication signals that comply with one or more of the known communication protocols. According to one embodiment, the core network 210 can provide communication signals that comply with 5G protocols.

As illustrated in FIG. 2, the communication system 200 facilitates communication between the core network node 215, coupled to the core network 210, and user equipment for a plurality of users (UEs) 280 and 285. The core network node 215, also referred to as a GnodeB or GnB, provides an interface between the core network 210 and any network communication elements in the core network 210, in a manner similar to gateway 140. According to some embodiments, the core network node 215 can also provide a communication interface to other networks that utilize different communication protocols.

According to the illustrated embodiment, the core network node 215 can communicate with the UEs 280 and 285 through a baseband unit (BBU) 245 coupled to the core network node 215 and remote radio units (RRUs) 270 and 275. The BBU 245 can interface the communication signal from core network 215 and transports the communication signal as a baseband signal over a wired medium (e.g., fiber, telephone, or coaxial cable) to RRUs 270 and 275. According to some embodiments the BBU 245 can provide a communication interface to other networks. The RRUs 270 and 275 can interface the baseband signal from BBU 245, and provide a signal conversion between the baseband signal and a wireless signal complying with a particular communication protocol (e.g., 5G) for communication with the UEs 280 and 285 respectively. According to some embodiments, more than one BBU and/or more than two RRUs can be used to facilitate communication.

According to one embodiment, a group of BBUs, similar to BBU 245, can be coupled together through a dedicated transport network to a group of RRUs, similar to RRUs 270 and 275, as a cloud radio access network (C-RAN) architecture. By centralizing the BBUs, several benefits can be provided to a network operator, such as ensuring that all infrastructure and routing resources can be used efficiently as well as improving performance due to greater coordination between RRUs. As illustrated in FIG. 2, the UEs 280 and 285 communicating with RRUs 270 and 275 can include, for example, one or more phones or smartphones, tablet computers, and laptop computers. Different UEs including, but not limited to, smart speakers, smart televisions, smart appliances, other IoT devices, etc. (not shown) can also be used for communicating with RRUs 270 and 275. According to some embodiments, home networking CPEs, such as home gateways, and home WiFi routers, can also communicate with RRUs 270 and 275.

According to the illustrated embodiment, communication between the core network node 215 and BBU 245 can also be facilitated through gateway 220 coupled to core network node 215 and communicating via satellites 230 and 235 to terminal 240, coupled to BBU 245. Communication via each one of the satellites 230 and 235 forms two separate satellite networks. More particularly, satellite 230 can be a LEO (or MEO/GEO) satellite which is part of a first satellite network. Satellite 235 can be a GEO (or LEO/MEO) satellite which is part of a second satellite network. According to some embodiments, more or less than two satellite networks can be formed, for instance, based on the number of different satellites. The portion of communication system 200 that facilitates communication between the core network node 215 and the BBU 245 can be referred to as the backhaul portion of the system, or the backhaul network. Accordingly, communication in the backhaul network can be provided through the core network, one or both of satellite networks formed through satellite 230 and satellite 235, or any combination of satellite and terrestrial networks that may be present.

According to the illustrated embodiment, communication between the BBU 245 and the RRUs 270 and 275 can also be facilitated through terminal 250 via satellites 260 and 265 as two separate satellite networks. For example, satellite 260 can be a LEO (or MEO/GEO) satellite which is part of a first satellite network. Satellite 265 can be a GEO (or LEO/MEO) satellite which is part of a second satellite network. According to some embodiments, more or less than two satellite networks can be formed, for instance, based on the number of different satellites. The portion of communication system 200 that facilitates communication between the BBU 245 and the RRUs 270 and 275 can be referred to as the fronthaul portion of the system, or the fronthaul network. Accordingly, communication in the fronthaul network can be provided through the core network, one or both of satellite networks formed through satellite 260 and satellite 265, or any combination of satellite or terrestrial networks that may be present. As illustrated in FIG. 2, satellites 230, 235, 260, and 265 are shown as different satellites. However, according to some embodiments, satellite 230 and satellite 260 can be the same satellite, and/or satellite 235 and satellite 265 can be the same satellite. Additionally, one or more of the satellites illustrated in FIG. 2 can be part of a constellation of satellites.

According to at least one embodiment, the gateway 220 facilitates communication between core network node 215 and terminal 240 via satellites 230 and 235. According to an embodiment, the gateway 220 can include one or more RFTs 222 for communicating signals containing IP data traffic with satellites 260 and 265. The gateway 220 can also include a processing unit 224, baseband unit 225, storage unit 226, and fault unit 228. The gateway 220 can further include a network interface 229 that includes networking components specific to interfacing with communication signals in the core network 210. The networking components can include, for example, one or more edge routers, and one or more processors capable of implementing edge functions, applications, services utilized in the core network 210, etc.

According to the illustrated embodiment, each of satellites 230 and 235 can be located at different orbital positions. A satellite's orbital position can be classified into four orbital regions. Very low earth orbit (VLEO) is the closest region from earth where satellites can be positioned. The typical range of VLEO orbit's position or distance from the ground is 350 kilometers (km) to 600 km. Satellites in the low earth orbit (LEO) have a range of distance from the ground between 600 km to 1200 km. Satellites in the medium earth orbit (MEO) region can be positioned from the end of LEO range (1200 km) to the distance for geostationary (GEO) orbit. The GEO region is the farthest region from earth where satellites can be positioned. Satellites in GEO orbit are 35786 km above the equator.

Each of the four orbital regions also includes different operational characteristics. For example, satellites positioned in either the LEO or MEO orbital region will have lower signal latency and, in some cases, higher data rate and/or reliability, than a satellite positioned in the GEO orbital region due to the shorter travel distance for the signal. For example, the signal latency, measured as the time to complete a round trip (RTT), is typically 40 milliseconds (msec) for LEO orbit, 180 msec for MEO orbit, and 600 msec for GEO orbit. For comparison, the RTT for a terrestrial wired or wireless communication network spanning 2000 miles can be less than 20 msec. Further, satellites positioned in the VLEO, LEO, and MEO orbit ranges are more complex and challenging to operate in a satellite network as these satellites are moving with respect to the earth, unlike satellites in the GEO region. As a result, a single satellite in a VLEO, LEO, or MEO orbit can be in contact with ground equipment, (e.g., gateway 220 or terminal 240) for a very small amount of time. In order to facilitate continuous network communication, a cluster or constellation of satellites is deployed, and a handover mechanism is established between individual satellites.

According to an embodiment, satellite 230 can be one of a constellation of satellites positioned and operating cooperatively in the LEO region, hereafter referred to as a LEO satellite. Satellite 235 can be positioned in the GEO region, hereafter referred to as a GEO satellite. According to some embodiments, satellites 230 and 235 can be positioned in the same orbital region (e.g., both in the LEO region, both in the MEO region, or both in the GEO region).

According to the illustrated embodiment, terminal 240 can be configured for communicating with gateway 220 via satellites 230 and 235. Terminal 240 can include one or more antenna dishes of different sizes. Terminal 240 can further be configured with an interface to communicate with BBU 245 as part of the backhaul network. Terminal 240 can also include one or more processors along with memory and/or data storage units for processing the incoming/outgoing traffic as well as managing the interface to gateway 220 via satellites and the interface to the BBU 245. According to some embodiments, terminal 240 can be referred to as a non-terrestrial network (NTN) UE or an NTN terminal.

According to the illustrated embodiment, terminal 250 can be configured for communicating data traffic with RRUs 270 and 275 via satellites 260 and 265 in a manner similar to terminal 240. Terminal 250 can include, for example, one or more antenna dishes of different sizes as well as processors and memory and/or storage units. Terminal 250 can further be configured with an interface to communicate with BBU 245 as part of the fronthaul network. According to some embodiments, terminal 240 can be referred to as an NTN line termination GnodeB (NTN LT gnB). According to some embodiments, one or both of terminals 240 and 250 can be in the form of very small aperture terminals (VSATs) that are mounted on a structure or habitat, as previously discussed. According to some embodiments, in situations where terminals 240 and 250 are both co-located with BBU 245, the functions and operation of terminals 240 and 250 can be combined into a single terminal. The combined terminal can further include a plurality of RFT antennas for independently communicating with satellites 230 and 235 and satellites 260 and 265.

According to some embodiments, each of the RRUs 270 and 275 can incorporate one or more antenna dishes along with circuitry and/or components for receiving and transmitting signals via satellites 260 and 265. Satellites 260 and 265 operate in a manner similar to satellites 230 and 235 but specifically support communication with terminals 240a-240n as well as communication with the gateway 220. According to the illustrated embodiment, each of satellites 260 and 265 can be positioned at different orbital locations, as previously discussed. According to an embodiment, satellite 260 can be one of a constellation of satellites positioned and operating cooperatively in the LEO region, hereafter referred to as a LEO satellite. Satellite 265 can be positioned in the GEO region, hereafter referred to as a GEO satellite. According to some embodiments, satellites 260 and 265 can be positioned in the same orbital location.

The NMS 290 maintains, in part, information (e.g., configuration, processing, management, etc.) for the gateway 220, and terminals 240 and 250 in a manner similar to that described for NMS 170. According to some embodiments, the NMS 290 can also be configured to maintain, in part, information (e.g., configuration, processing, management, etc.) for elements in the core network, including core network node 215, BBU 245, and RRUs 270 and 275. According to some embodiments, NMS 290 can analyze one or more data traffic flow conditions (or simply traffic conditions) associated with operation of one or more of the core networks or satellite networks. The traffic conditions are typically indicative of QoS or QoE within the network and can include. Traffic conditions can include, but are not limited to, link error rate, data rate, queue depth, traffic latency, jitter, link condition, etc. According to some embodiments, the NMS 290 can receive information associated with measurements of one or more of the traffic conditions determined from any of the network nodes or network devices. According to some embodiments, the NMS 290 can further analyze the measurements and provide the results of the analysis back to any of the network nodes or devices.

According to some embodiments, communication system 200 can be implemented using software defined networking (SDN) principles. SDN principles simplify the management of network devices in communication system 200 by decoupling some or all of the network control logic that controls and/or facilitates the movement of data in one or more of the networks from the actual location of those network devices. SDN principles can be implemented, for example, using Network Functions Virtualization (NFV). NFV is a type of network architecture capable of virtualizing entire network node functions onto servers and other devices that can be located in centralized locations such as core network 210 or data network 205. According to some embodiments, core network node 215, BBU 245, and RRUs 270 and 275 can be configured to implement SDN using VFN as part of core network 210. According to some embodiments, the gateway 220, terminal 240, and terminal 250 can be configured to implement SDN using VFN using NMS 290 coupled through core network 210.

As illustrated in FIG. 2, communication system 200 implements a network architecture that can be referred to as an indirect access via transport network architecture. In such architectures, the data streams from the core network 210 that are communicated via one or more satellites (e.g., satellites 230, 235, 260, 265) are sent as satellite signals containing encapsulated data flows. According to one embodiment, the data flows can be communicated in the forward link, or outroute, as signals that comply with the DVB-S2X standard. The data flows can be communicated in the return link, or inroute, as signals that comply with the IP Over Satellite (IPOS) standard. According to some embodiments, communication system 200 can further be configured to implement different network architectures including, but not limited to, transparent satellite-based direct third generation partnership project (3GPP) access, regenerative satellite-based direct 3GPP access, transparent satellite-based indirect 3GPP access, regenerative satellite-based indirect 3GPP access, and transparent satellite-based indirect mixed access.

According to some embodiments, the communication system 200 can be modified to implement an indirect access via transport network architecture for only the backhaul network. In such embodiments, terminal 250, along with satellites 260 and 265, may not be present or used in conjunction with operation in the fronthaul network. Accordingly, elements in the fronthaul network can communicate using only the core network. According to other embodiments, the communication system 200 can be modified to implement an indirect access via transport network architecture for only the fronthaul network. In these embodiments, gateway 220 and terminal 240, along with satellites 230 and 235 may not be present or used in conjunction with operation in the backhaul network. Accordingly, elements in the backhaul network can communicate using only the core network.

Figure 3:
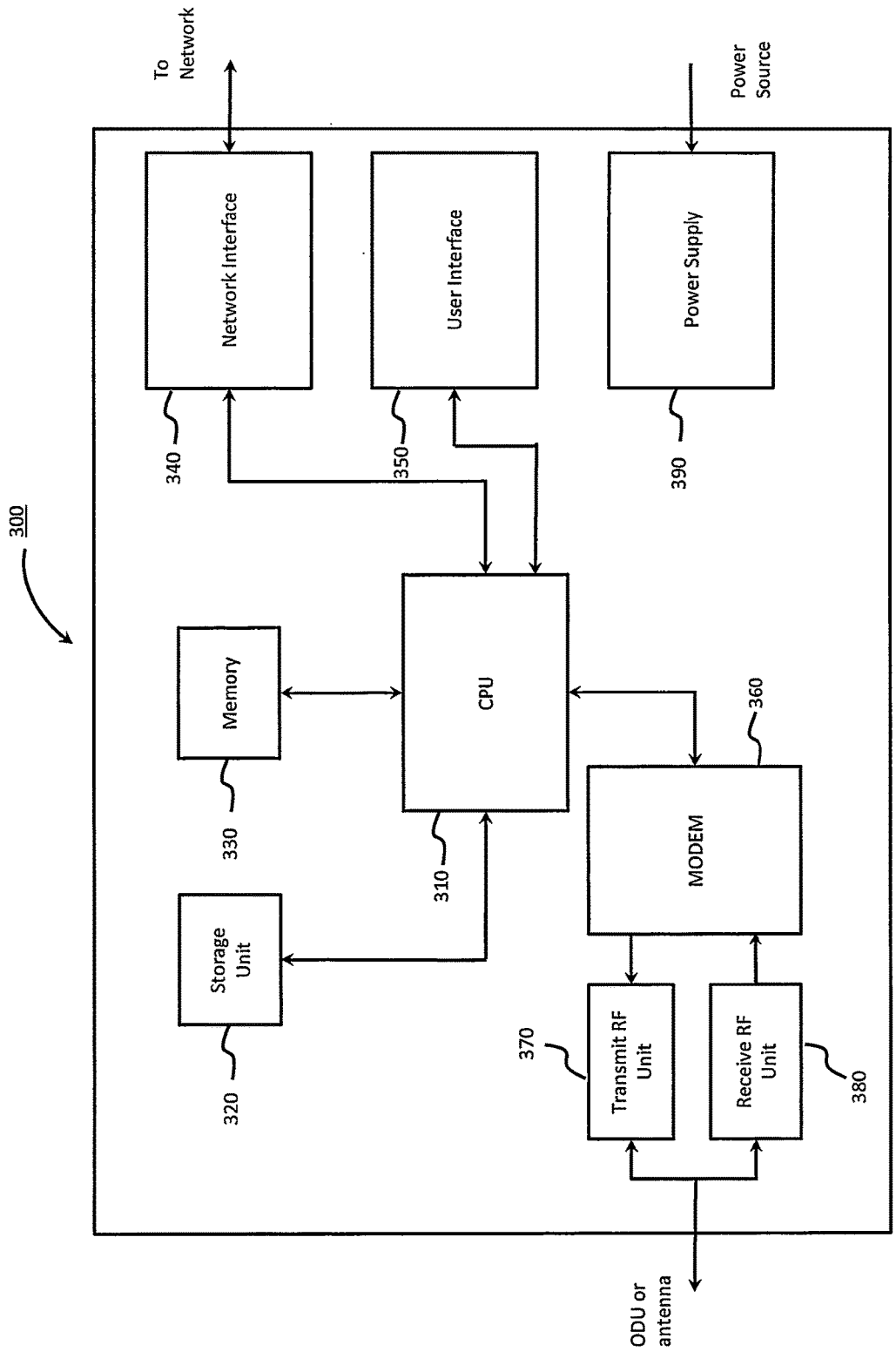
FIG. 3 is a diagram of a terminal that can be used in the system of FIG. 2, according to at least one embodiment.

FIG. 3 is a diagram of a terminal 300, such as used in the system of FIG. 2, according to at least one embodiment. The terminal 300 can include, for example, a CPU 310 coupled to a storage unit 320, a memory 330, a network interface 340, a user interface 350, and a modem 360. Modem 360 is further coupled to a transmit radio frequency (RF) unit 370 and a receive RF unit 380. Although not explicitly shown, power supply 390 can be coupled to any of the blocks shown in terminal 300 that requires local electrical power. It should be noted that terminal 300 can include various additional components which perform conventional operations. Such components are well known to those skilled in the art and are omitted in order to provide better clarity and conciseness in describing the features of terminal 300.

CPU 310 can include one or more specifically built processing elements and/or general purpose processors configured or programmed to perform specific tasks associated with the operation, control, and management of activity in terminal 300. According to some embodiments, CPU 310 can be configured to utilize software or firmware applications or functions associated with providing specific network operations. The applications or functions are provided over a network (e.g., core network 210 or a satellite network via satellites 230, 235) using NFV as part of SDN as discussed previously.

Storage unit 320 can be any one of several large and/or removable storage elements including, but not limited to, solid state disc, magnetic disc, and optical disc. Memory 330 can be any type of electronic circuit or small scale based storage elements including, but not limited to read-only memory (ROM), erasable electrically programmable ROM (EEPROM), random-access memory (RAM), non-volatile RAM (NVRAM), flash memory, or other similar memory technology. Storage unit 320 and/or memory 330 can be used to store instructions or software code used by CPU 310 and data associated with operations of terminal 300. Storage unit 320 can also be used for longer term storage of data and/or multimedia content transmitted and/or received through modem 360 or local network interface 340. Memory unit 330 can be used for shorter term or temporary storage of data and/or multimedia content needed for, or associated with, signal and data processing in terminal 300.

Network interface 340 includes circuit elements configured for interfacing to a first network, such as the core network described in FIG. 2. Network interface 340 can include interface components to bidirectionally communicate data streams either through a wired medium or wirelessly to network devices, such as BBU 245. Network interface 340 can receive data streams as part of one or more data flows, along with processing instructions from CPU 310. Network interface 340 can further receive data streams provided over the network and provide them to CPU 310 for further processing.

User interface 350 can include a user input or entry mechanism, such as a set of buttons, a keyboard, or a microphone. User interface 350 can also include circuitry for converting user input signals into a communication format to provide to processor 310. User interface 350 can further include some form of user notification mechanism to show device functionality or status, such as indicator lights, a speaker, or a display. User interface 350 can also include circuitry for converting data received from processor 310 to signals that can be used with the user notification mechanism.

Modem 360 performs all the functions necessary for modulating and demodulating a signal to/from transmit RF unit 370 and receive RF unit 380. These elements and/or functions can include, but are not limited to, digital signal conditioning, symbol mapping, demapping, data error correction encoding/decoding, and transport stream processing for interfacing data to and from the CPU 310. According to various embodiments, modem 360 can perform the modulating/demodulating functions independently or under control of the CPU 310. Transmit RF unit 370 processes the digital signal from modem 360 to form an analog signal for transmission through a satellite dish included as part of an outdoor unit (ODU) or an antenna (not shown). Receive RF unit 380 processes the analog signal received through the satellite dish or antenna to form a digital signal that is further processed in modem 360. The processing elements or functions in transmit RF unit 370 and receive RF unit 380 include, but are not limited to, signal amplification, filtering frequency up/down conversion, analog to digital signal conversion, digital to analog signal conversion, etc.

Terminal 300 can interface and communicate with more than one satellite dish as part of the ODU. Accordingly, terminal 300 can include more than one modem, receive RF unit, and/or transmit RF unit in order to process signals from more than one satellite as discussed previously. According to one embodiment, modem 360 can be capable of modulating and demodulating multiple transport streams simultaneously. Terminal 300 can include a first receive RF unit 380 and transmit RF unit 370 that communicate satellites operating as part of a LEO satellite network. Terminal 300 can further include a second receive RF unit and transmit RF unit (not shown) that communicate with a second satellite operating as part of a GEO satellite network.

While FIG. 3 illustrates components such as modem 360, transmit RF unit 370, and receive RF unit 380, within terminal 300, it should be noted that various embodiments can allow for part, or all of, one or more of these components to be included in the ODU. Further, parts of one or more components can be combined or rearranged without altering the overall function and purpose of terminal 300. Thus, the specific arrangement shown in FIG. 3 should only be considered as illustrative and is in no way intended to be restrictive, as those skilled in the art would be able to implement such changes.

Figure 4:
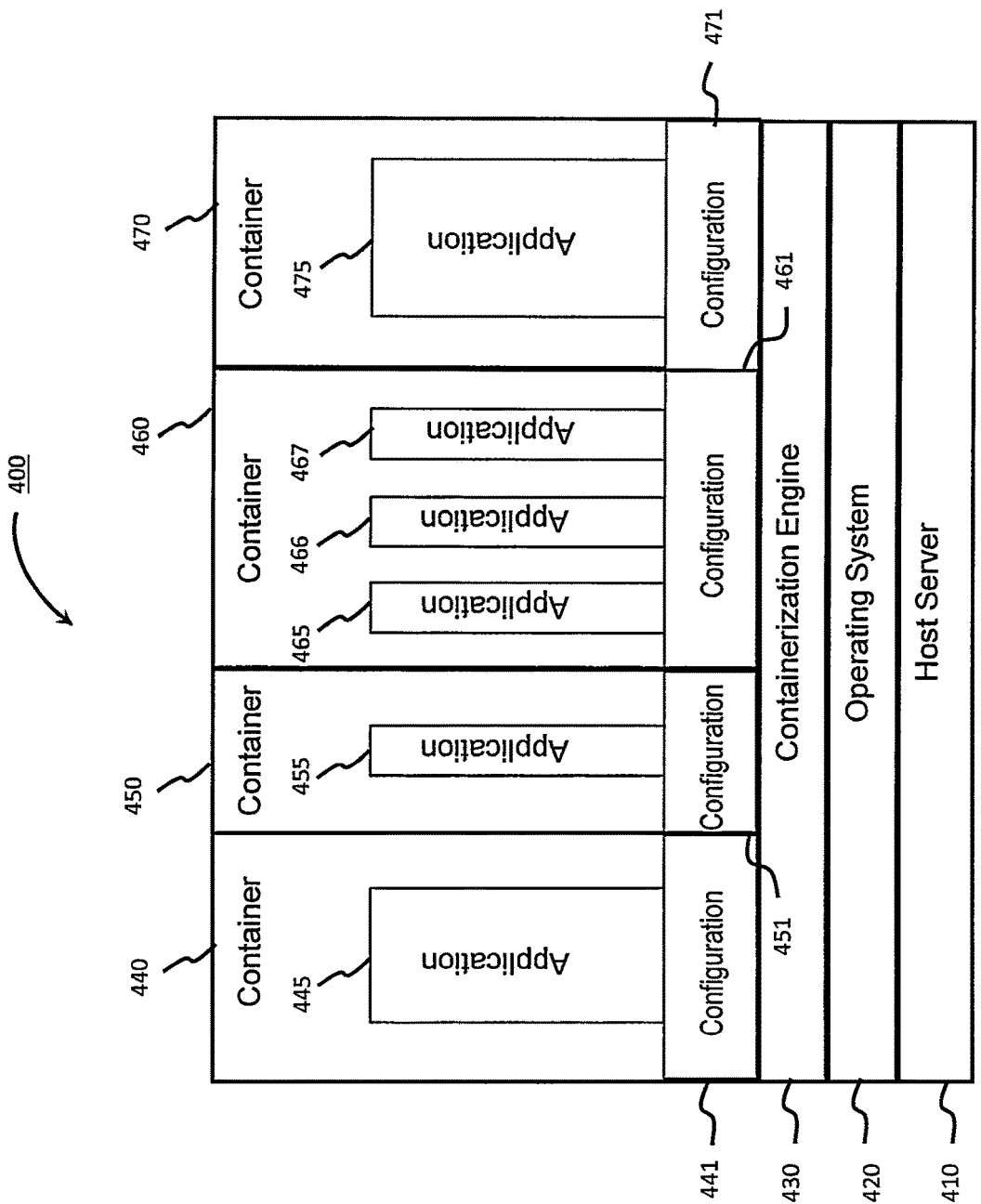
FIG. 4 is a diagram illustrating an application containerization structure 400 implemented in a terminal, according to some embodiments.

FIG. 4 is a diagram illustrating an application containerization structure 400 implemented in a terminal, such as terminal 240 and/or terminal 250, according to some embodiments. The application containerization structure 400 can be configured in any combination of software or firmware and implemented in one or more processors in the terminal, such as CPU 310 in terminal 300. According to some embodiments, the application containerization structure 400 can also be implemented in a gateway, such as gateway 220, as well as in an RRU, such as RRU 270 and/or RRU 275. The application containerization structure 400 can be configured to include, for example, a host server 410, an operating system 420, and a containerization engine 430. The application containerization structure 400 can also include containers 440, 450, 460, and 470, also referred to as virtualized containers. Containers 440, 450, and 470 each include a configuration block 441, 451, and 471 respectively. Containers 440, 450, and 460 each also include an application block 445, 455, and 475 respectively. Container 460 includes a configuration block 461 and application blocks 465, 466, and 467. According to the illustrated embodiment, each of the containers 440, 450, 460, and 470 is shown as having different sizes due to varying sizes for configuration blocks and application blocks as well as the varying number of application blocks in each container. According to some embodiments, more or fewer application blocks can be present in each container.

An application containerization structure, such as application containerization structure 400, is one of several alternative configurations for implementing network function virtualization (NFV) in a terminal (e.g., terminal 300) or other network device. The implementation can also be referred to as an edge platform. There are several differences between an application containerization structure and a similar virtual machine (VM) structure. For example, a VM structure includes one or more VMs that can run on the one or more processors in a terminal (e.g., CPU 310) managed through a hypervisor. The software associated with the virtualized application or function that is loaded into the terminal and is run as a VM also includes its own guest OS. As a result, the terminal, which is typically limited in both processing capability and data storage, can be required to interface, and operate with more than one OS when implementing a VM structure. An application containerization structure can be configured using OS level virtualization in the terminal allowing distributed and virtualized applications without launching an entire virtual machine with a guest OS for each app.

According to the illustrated embodiment, a terminal (e.g., terminal 300) can be configured to run an implementation of an operating system 420 through a host server 410. The host server 410 provides the interface between the applications configured and implemented as part of the application containerization structure 400 and other functions and/or operations in the terminal (e.g., terminal 300). According to some embodiments, the operating system that is used can be based on Linux, Unix, Microsoft Windows, Apple iOS or MacOS, or Ubuntu.

The implementation of container-based virtualization of the applications is controlled through containerization engine 430 which allows the containers 440, 450, 460, and 470 to share functions from operating system 420. According to an embodiment, each configuration layer 441, 451, 461, and 471 includes binary files, libraries, and configuration files need to run the software code for the virtualized application 445, 455, 465, and 475 from each of the containers, 440, 450, 460. According to an embodiment, the containerization engine 430 can be treated as a resource of an infrastructure-as-a-service (IaaS). The virtualized container environment can be configured to run as an independent platform-as-a-service (PaaS) as part of NFV techniques as discussed previously.

According to some embodiments, one or more virtualized applications or network functions that provide network services based on NFV can be hosted using virtualized containerization architecture 400. According to some embodiments, one or more of the containers 440, 450, 460, and 470 can host applications or functions to enable certain 5G applications that are an ultra-reliability low latency (URLLC) type of service. These types of 5G applications include, but are not limited to, tactile internet, interactive gaming, virtual reality, automotive, industrial, and automation applications or functions.

According to one embodiment, container 440 includes an application for implementing a domain name service (DNS) in a satellite network. DNS is an edge function that caches DNS query requests for a domain name at the terminal (e.g., terminal 300). DNS serves the subsequent request for the same domain name from the local cache. According to one embodiment, container 450 includes an application for implementing an IoT service in a satellite network. The IoT service edge function that provides processing of IoT data proximity to elements in the network at the edge of the C-RAN in the terminal (e.g., terminal 300). The IoT service implements lightweight IoT server functions by responding to the request from a client to reduce the amount of traffic sent through return channels of the backhaul portion of the network and allows for a faster response to requests.

According to one embodiment, container 460 includes applications for implementing a live video streaming service that also includes multicast and content caching services in a satellite network. When the satellite network is used for live video streaming content, it is difficult to assure users' QoE due to large latency and bit errors that can be inherent in the satellite network. The applications that are included in container 460 can allow terminal 300, operating as an edge platform, to provide QoE-assured live video streaming via the satellite network by realizing transient holding and localization of HTTP-based video segments. According to some embodiments, streaming protocols, such as MPEG-DASH and Apple HTTP Live Streaming can divide a video stream into multiple slices that are delivered in the format of sequenced files in response to HTTP requests from clients.

According to one embodiment, a content provider can deploy its own applications to be placed into container 460 in terminal 300 to perform caching and transient segment holding. When a UE sends an HTTP request in a live streaming session, it is first resolved to the content provider's container applications, which intercepts the request and provides a reverse HTTP proxy function. The application downloads video segments from the content provider's server and caches them locally in terminal 300 before they are requested by users.

Further, a client (e.g., in a UE) can periodically request the manifest file for the video stream from the content provider's server using an HTTP request, so that it can be aware of the latest segments produced at the server. The applications handle all requests of manifest files and video segments by intercepting the client requests. The concept of holding back the availability of some most recent segments produced by the server can indicate to the client device that these most recent segments are not produced yet so that the client sends requests for video segments which have been previously produced at the server. Accordingly, the applications can prefetch the held back segments before being requested by the client.

Additionally, in some instances, more than one client or network node can request the same live video stream. In these instances, the applications in container 460 can request and/or convert the live video stream to a multicast stream. According to some embodiments, a terminal that is capable of receiving more than one channel or beam, including from more than one satellite as discussed previously, can receive the live video stream as a multicast stream and a regular unicast stream simultaneously. Further, to alleviate issues due to latency and packet loss when using standard TCP/IP with multicast, the applications in container 460 can employ a TCP Performance Enhancing Proxy (PEP) that has been used in satellite communication networks.

According to one embodiment, container 470 includes an application for implementing a network traffic routing multipath service. The network traffic routing multipath service application utilizes a traffic aware bonding and redundancy approach to send data traffic between a host device (e.g., gateway 220) and a client device (e.g., terminal 240) over a set of networks instead of only in the main network (e.g., the core network). The application includes a policy-based traffic routing mechanism that is implemented as an edge function. According to some embodiments, the application can identify traffic flow sessions that are capable of being communicated between the client and host in one or more of the available networks. The application, when included in the host at a network communication departure point, can segment or split one or more of the data streams in the data traffic flow session into two or more portions of each data stream. The application provides the segmented portions for transmission from the departure point (e.g., host) via the available networks based on an analysis of traffic flow conditions in those networks. According to one embodiment, each one of the segmented portions can be provided for transmission via a different one of the available networks. The application can further generate assembly information for each portion. The assembly information identifies how the portions were segmented and facilitates the reassembly of the data stream(s) in the traffic flow at a network communication destination point (e.g., client). According to some embodiments, the assembly information can be provided for transmission via one of the available networks.

According to some embodiments, the network traffic routing multipath service application, when included in a client, can retrieve the assembly information that was received by the client (e.g., terminal 240) at a destination point. The application can also retrieve the segmented portions that were received by the client and reassemble the segmented portions into the one or more data streams in the data traffic flow session originally segmented in the host (e.g., gateway 220) using the assembly information. Accordingly, the application can communicate data traffic flow sessions requested by users or customers using multiple networks and can be transparent to the users or customers.

Figure 5:
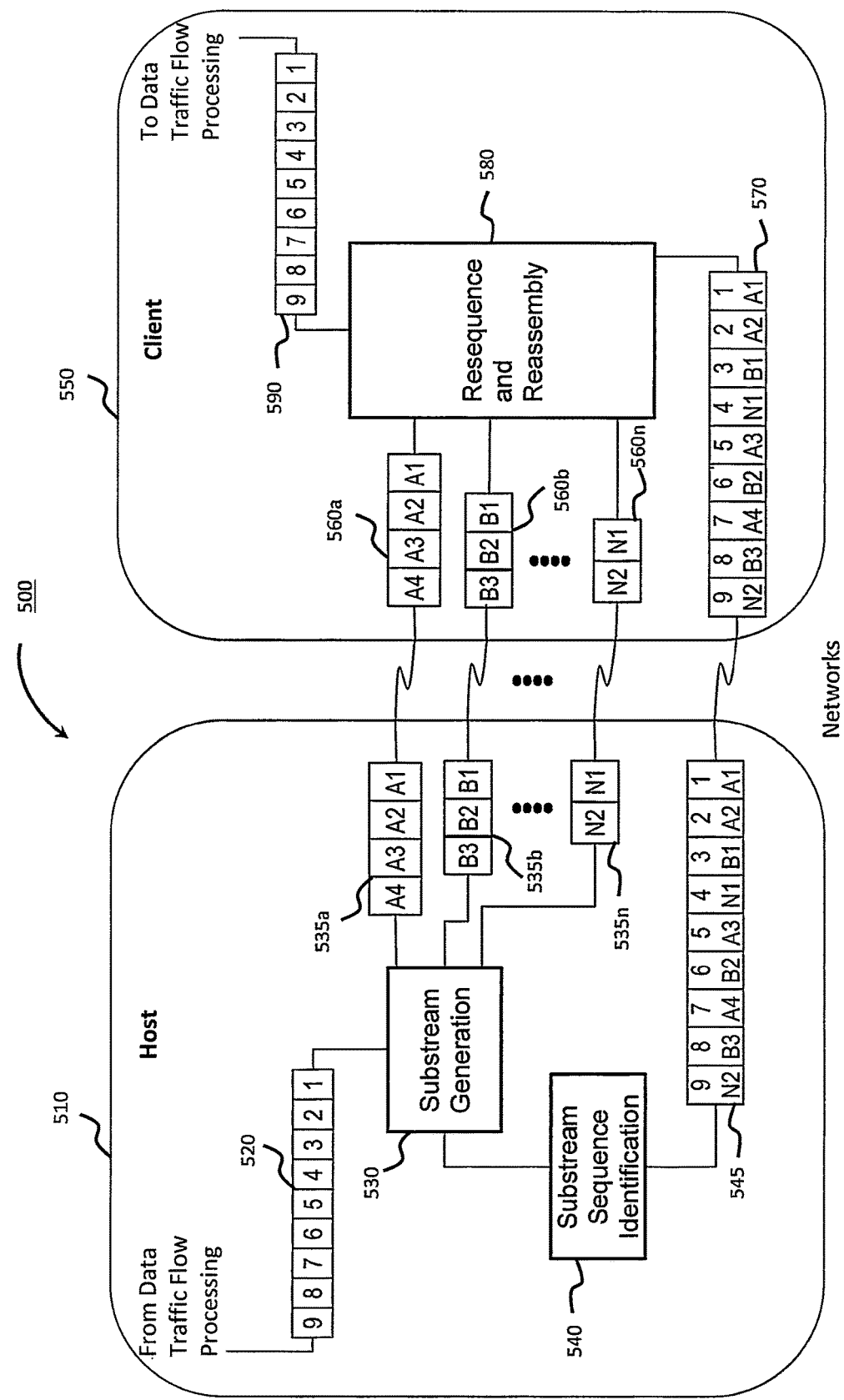
FIG. 5 is a diagram of a data stream segmenting and reassembly structure, in accordance with one or more embodiments.

FIG. 5 illustrates a diagram of a data stream segmenting and reassembly structure 500, in accordance with one or more embodiments. The data stream segmenting and reassembly structure 500 can be implemented in any combination of hardware, software, or firmware as part of a network device, such as a gateway, a terminal, and/or an RRU as discussed previously. The data stream segmenting and reassembly structure 500 can be included as part of an application for implementing as network traffic routing multipath service, such as described in FIG. 4. For purposes of example, data stream segmenting and reassembly structure 500 can be described with respect to a data stream that is communicated over a backhaul network that includes a core network, terrestrial networks, and a plurality of satellite networks.

The data stream segmenting and reassembly structure 500 can be configured to include, for example, a host 510 and a client 550 communicating with each other over a plurality of satellite networks via satellites (e.g., satellites 230 and 235). The host 510 can include a memory register 520 that contains packets of a data stream that have been processed as part of a data traffic flow process in other elements in host 510. The host 510 can also include a substream generation block 530 along with memory registers 535*a*-535*n* that contain packets for each of the data substreams generated from the substream generation block 530. The host 510 can further include a substream sequence identification block 540 along with memory register 545 that contain data packets for a sequence identifier stream generated from the sub stream sequence identification block 540. The memory registers 535*a*-535*n* and memory register 545 can provide the data packets to other elements in the host 510 for outroute transmission via the plurality of networks.

Client 550 can include memory registers 560*a*-560*n* that contain packets from each of the data substreams received by client 550 from host 510 over the plurality of networks. The client 550 can also include memory register 570 that contains data packets for the sequence identifier stream that is received by client 550. The client 550 can further include a resequence and reassembly block 580 along with memory register 590 that contains data packets for the reproduced data stream that was processed as part of a data traffic flow process in host 510. Although data stream segmenting and reassembly structure 500 is described using outroute communication between host 510 and client 550, the structure can also be used for inroute communication by interchanging the blocks included in host 510 with the blocks included in client 550 and vice versa.

According to the illustrated embodiment, memory register 520 includes nine memory locations that can contain or store data packets in a sequence. Each of the data packets can include a packet identifier along with any fields required for processing the data packets, data substreams, and data streams. According to some embodiments, the packet identifier can be included in a header in the data packet. For example, the memory register 520 contains nine data packets in a sequence with packet identifiers 1-9. According to some embodiments, memory register 520 can be implemented as a first-in-first-out (FIFO) memory and can include more or fewer memory locations.

Substream generation block 530 receives each one of the data packets from memory register 520 and delivers the data packet for inclusion in one of the memory registers 535a-535n. According to the illustrated embodiment, memory register 535a includes four memory locations, memory register 535b includes three memory locations, and memory register 535n includes two memory locations. The delivery of the data packets from the substream generation block 530 to each of the memory registers 535a-n creates a set of data substreams. Each of the data substreams have a sequence of data packets that is different from the sequence of data packets for the data stream contained in memory register 520. According to an embodiment, the substream generation block 530 can remove the packet identifier included in each of the data packets for the data stream stored in memory 520 and replace it with a packet identifier associated with one of the data substreams based on a sequence order of delivery to one of the memory registers 535a-n. For example, the data packets in memory register 535a can include packet identifiers A1-A4. The data packets in memory register 535b include packet identifiers B1-B3. The data packets in memory register 535n include packet identifiers N1-N2. According to some embodiments, some or all of memory registers 535a-n can be implemented as a first-in-first-out (FIFO) memory and can include more or fewer memory locations. According to some embodiments, the number of memory locations in some or all of memory locations 535a-n can be dynamically increased or decreased based on the segmentation performed in substream generation block 530.

The decision as to which of the memory registers the data packet is delivered can be based on analysis of current traffic conditions. As previously discussed, the traffic conditions can include link delay, link error rate, data rate, queue depth, traffic latency, jitter, link condition, etc. According to one embodiment, continuous measurement of link delay or traffic latency is used to determine congestion on each one a plurality of satellite networks, including a LEO satellite network and a Geo satellite network. The measurement can be performed at various points within the communication system such as the client 550. The measurement results can be communicated to the host 510 either directly from client 550 or through a network management device (e.g., NMS 290). The measurement results can be processed in the host 510 (e.g., in substream generation block 530) to determine congestion levels on the plurality of satellite networks. For example, if it is determined that the LEO satellite network is congested, the substream generation block 530 can provide more data packets to memory register 535a associated with a data substream transmitted via the GEO satellite network and less data packets to memory register 535b associated with a data substream transmitted via the LEO satellite network. The segmenting or splitting of the data stream based on congestion can be referred to as congestion aware splitting.

According to the illustrated embodiment, the substream sequence identification block 540 receives information from the substream generation block 530 in order to generate the sequence identifier stream. The information can include the packet identifier for each of the data packets from the data stream in memory register 520 along with the corresponding replacement packet identifier for that data packet that is delivered to one of the memory registers 535a-n. According to some embodiments, the substream generation block 530 can provide the data packets in memory register 520 in addition to, or instead of, just the packet identifiers. The substream sequence identification block 540 can further generate a set of data packets that are included in the sequence identifier stream. Each one of the set of data packets corresponds to one of the data packets from register memory 520 and includes the packet identifier for a data packet from register memory 520 along with the packet identifier for that same data packet delivered to one of the memory registers 535a-n. According to some embodiments, the packet identifier for the data packets from memory register 520 can be included in the header of data packet and the packet identifiers for the data packets from memory registers 535a-535n can be included in an option field in the body of data packet.

According to the illustrated embodiment, the substream sequence identification block 540 can deliver the set of data packets to memory register 545 in the sequence order for the data packets from memory register 520. For instance, the data packets in memory register 520 can identify packet identifier 1 as corresponding to packet identifier A1, packet identifier 2 as corresponding to packet identifier A2, packet identifier 3 as corresponding to packet identifier B1, packet identifier 4 as corresponding to packet identifier N1, packet identifier 5 as corresponding to packet identifier A3, packet identifier 6 as corresponding to packet identifier B2, packet identifier 7 as corresponding to packet identifier A4, packet identifier 8 as corresponding to packet identifier B3, and packet identifier 2 as corresponding to packet identifier N2.

According to other embodiments, the corresponding relationship between the sequence of packets from memory register 502 and the sequence of packets from memory registers 535a-n can be different. According to at least one embodiment, memory register 545 can be implemented as a first-in-first-out (FIFO) memory and can include more or fewer memory locations. As such, memory registers 520, 535a-n, and 545 can be continuously updated with data packets. As data packets are retrieved (e.g., for processing or transmission), new data packets can be loaded into the memory registers 520, 535a-n, and 545.

According to the illustrated embodiment, the client 550 receives the data substreams representing the data stream processed in the host 210 via the plurality of networks and places data packets from each of the data substreams in memory registers 560a-560n. The client 550 also receives the sequence identifier stream via one of the plurality of networks and places data packets from that stream in memory register 570. The configuration of the memory registers 560a-560n can be similar to the configuration of memory registers 535a-535n. According to some embodiments, the configuration of the memory registers 560a-560n can be different and/or can be dynamically configurable. For instance, memory registers 535a-535n can be larger in size than memory registers 535a-535n and be configured for direct input sequential writing and direct access reading capabilities. According to an embodiment, the configuration of memory 570 can be similar to the configuration of memory register 545 as long as the sequence order of transmission of the data packets in the sequence identifier stream is not changed.

According to the illustrated embodiment, the resequence and reassembly block 580 can retrieve each of the data packets from memory register 545 in sequence order. The packet identifier for the retrieved data packet is subsequently identified (e.g., from the header) so that the packet identifier for the corresponding packet in one of the data substreams can be extracted from the retrieved data packet (e.g., from the option field). The data packet with the corresponding extracted packet identifier can be retrieved from one of the memory registers 560a-560n and placed into memory register 590 as part of reproducing the data packets stored in memory register 520 in sequence order.

As can be appreciated, each of the data substreams transmitted over the plurality of networks can be subject to varying traffic conditions, such as different link delays and different data rates. Accordingly, the data packets in the data substream streams can be received in a different order than transmitted. According to various embodiments, the substream generation block 530 can continuously adjust the number of data packets placed into memory registers 535a-535n for each of the data substreams in order to adjust for the varying traffic conditions. The substream sequence identification block can further adjust the data packets in the sequence identifier in order to maintain the correspondence or mapping between the original data stream and the data substreams based on the adjustments by substream generation block 530. The adjusted mapping can be used by the resequence and reassembly block 580 to reproduce the data stream.

Depending on current operating conditions, one or more of the data substreams transmitted over the plurality of networks can be received at client 550 with data packet loss. The data packet loss can be due, in part, to a high link error rate as a traffic condition. However, the presence of data packet loss can be more difficult to ascertain due to the transmission and/or reception of data packets in the data substreams out of sequence with respect to the original data stream. According to some embodiments, a receiving circuit (e.g., receive RF unit 380 or modem 360) in client can determine data packet loss (e.g., by measuring link error rate) for one or more data substreams. The client 550 can notify the host 510 (e.g., through a return communication link) the information on the packet loss. The host 510 can notify the substream generation block 530 to retrieve a portion of the sequence identifier stream and place the data packets for the portion of the sequence identifier stream in one of the memory registers 535a-535n for transmission over a different network from the network used for the sequence identifier stream. The client 550 can use the received data packets portion of the sequence identifier stream to determine the order of data packet delivery for the substreams and determine whether data packet loss is actually present. According to some embodiments, substream generation block 530 can also adjust the delivery of data packets in one data substream with respect to the delivery of data packets in other data substreams. For example, the data packets delivered to memory register 535a associated with a data substream transmitted via the GEO satellite network can be provided for transmission before data packets delivered to memory register 535b associated with a data substream transmitted via the LEO satellite network due to the difference in inherent latency.

According to an embodiment, the data packets for the data substreams in memory registers 535a-535n and the data packets for the sequence identifier stream in memory register 545 can be communicated over the plurality of networks using one or more network connections referred to as satellite backbone connections. A satellite backbone connection is a reliable data transport flow that implements a satellite friendly protocol which considers satellite propagation characteristics like large delay (or latency) and bit errors. A satellite backbone connection can also include multiple data transport flows or subflows in a connection session. A satellite multipath backbone connection session that is implemented using the data stream segmentation and reassembly structure 500 starts with establishing an initial data transport subflow. According to an embodiment, the initial data transport subflow can include data packets from one or more of the data substreams associated with memory registers 535a-535n. Additional transport data subflows can be further established. The additional subflows can be regular satellite backbone connections that are further bound to an existing multipath backbone connection. Data for this multipath backbone connection can be sent over any of the active subflows that include data streams that have the required data traffic flow capacity.

In at least one embodiment, a satellite multipath backbone connection can be established between host 510 and client 550 as network peers using either a LEO satellite network or a GEO satellite network as a first subflow. The host 510 and client 550 can exchange one or more data substreams and/or the sequence identifier stream via this first subflow. A satellite multipath network connection handshake can be performed by the host 510 and client 550 using the yet unused (e.g., GEO, or LEO) satellite network before sending one or more additional data substreams and/or the sequence identifier stream via that network as another subflow. It is noted that the set of subflows that are associated with a multipath Satellite backbone connection is not fixed. One or more subflows can be added or removed from a multipath satellite backbone connection. Further, the host 510 and client 550 can communicate data substreams through two or more network paths using two or more sub flows associated with one multipath satellite backbone connection.

As individual customers, particularly business customers or network operators, have relied more and more on efficient network communication for their operations, the differing needs of each of these customers has placed greater emphasis on network configuration customization. A mechanism, referred to as network slicing, can be added as an edge function to networks that can be configured to implement SDN architectures, such as 5G core network, in order to address these needs. Network slicing creates a virtual network on top of a physical system infrastructure (e.g., communication system 200) such that the customer can virtually operate on its own dedicated physical network. According to an embodiment, a 5G network slice can be defined as a collection of 5G network functions and specific radio access technology settings that are combined to support a specific use case or business model as specified by the customer. The range of network functions and settings for 5G is significantly wider than in any previous generation of network architecture, allowing for wider capabilities to the customer.

According to some embodiments, an on-demand network slicing structure can be used in the satellite networks and interfaced to the network slicing structure in the 5G network. The resulting structure manages network slices as end-to-end slices. The end-to-end slices from the combined 5G network and satellite networks can be dynamically and centrally managed at a flow-level granularity to address operational issues with one or more of the networks, such as data traffic congestion, latency, or network failure. According to an embodiment, the management can be performed in an NMS, such as NMS 290. The end-to-end slices can be defined based on the network in which the end-to-end slices are communicated. According to an embodiment, the end-to-end slices can be defined based on a network performance characteristic, such as QoE or QoS where the end-to-end slices can refer to one or more differentiated data traffic handling needs (e.g., guaranteed service vs. best effort).

According to some embodiments, the operational capability of network devices in the satellite networks can be dynamically shared between the satellite network slices. For example, when satellite network slices associated with a LEO satellite network are not using some of the operational capability of gateway 220, the satellite network slices associated with a GEO satellite network can use it. Further, a pre-emption mechanism can be included that is based on priorities assigned to some, or all, of the satellite network slices. Accordingly, applying network slicing to the satellite networks allows operations of network devices to be dynamically and efficiently allocated to end-to-end slices according to the corresponding quality of service (QoS) demands as well as multi-path network demands.

Figure 6:
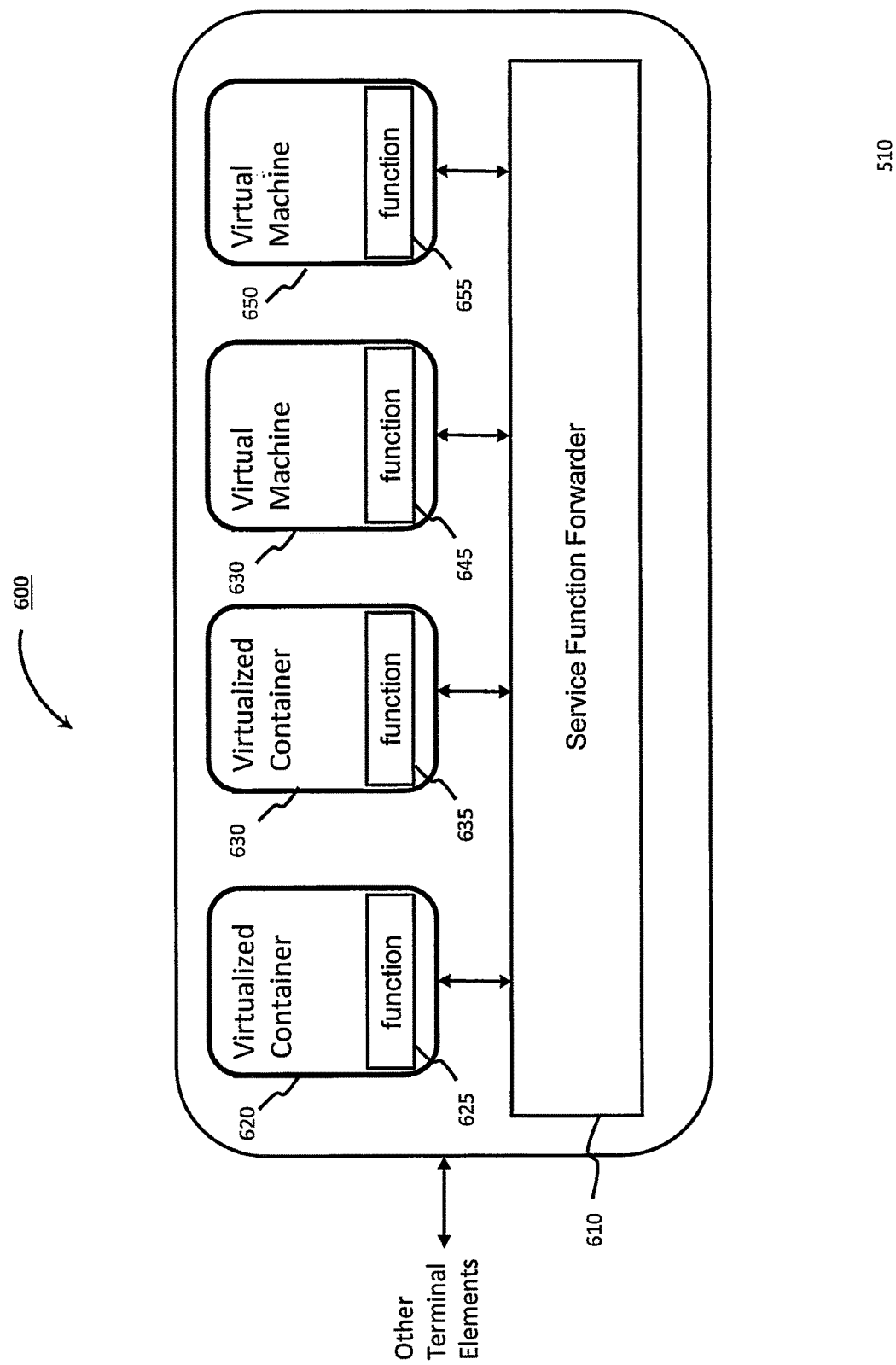
FIG. 6 is a diagram of a service function chain implemented in a terminal according to at least one embodiment.

FIG. 6 illustrates a diagram of a service function chain 600 implemented in a terminal according to at least one embodiment. The service function chain 600 can be configured in software and/or firmware, and implemented in one or more processors in a terminal, such as CPU 310 in terminal 300. The service function chain 600 can be included in networks that are configured to use network slices, including satellite networks as previously discussed. The service function chain 600 can be configured to include, for example, a service function forwarder 610 along with virtualized containers 620 and 630, and virtual machines 640 and 650. Each of the virtualized containers 620 and 630 (collectively virtualized containers), and virtual machines 640 and 650 (collectively virtual machines) includes a function 625, 635, 645, and 655 (collectively functions) respectively. According to some embodiments, more or fewer virtualized containers and/or virtual machines can be present in service function chain 300.

According to the illustrated embodiment, the service function forwarder 610 can be responsible for forwarding all or a portion of one or more received data streams in a data traffic flow associated with a network slice. The one or more received data streams include the data streams that have been transferred or moved from communication via the core network to communication via one of the other networks (e.g., one of the satellite networks). The data streams are forwarded to one or more of the virtualized containers and virtual machines using information conveyed in the service function encapsulation included with the data streams. According to some embodiments, the information conveyed in the service function encapsulation includes a function sequence, or function processing order, for each of the data streams. The data streams are transferred to one of the virtualized containers or virtual machines for processing and returned back to the service function forwarder 610. The service function forwarder 600 transfers the data streams to another one of the virtual containers or virtual machines, following the information in the service function encapsulation (e.g., function sequence).

According to the illustrated embodiment, the functions can perform operations for implementing connected network services in a core network (e.g., core network 210). The connected network services can be configured for NFV and used as part of SDN in the core network. According to some embodiments, the service functions can include a firewall, deep packet inspection (DPI), Network Address Translation (NAT), and traffic segregation by domain. The service functions can further include services specific to operation in other networks, such as satellite networks, used in conjunction with operation of the core network as previously discussed. The specific services can be modified and configured for NFV and used as part of SDN in the other networks (e.g., satellite networks) as discussed previously. According to some embodiments, one or more of these specific services can be associated with satellite network acceleration features. For example, the specific services can include TCP-PEP, service proxy, and quick user datagram protocol internet connections (QUIC) spoofing.

According to an embodiment, the service function chain 600 can be configured to manage data traffic flows associated with a plurality of network slices included in a core network, such as a 5G network, and communicated via one or more other networks, such as a GEO network and/or a LEO network. One or more data streams in the data traffic flows can be processed only in the functions needed for services based on the specific network slice. For example, a data stream in a data traffic flow associated with a first network slice can be processed by function 725 in virtualized container 720, function 735 in virtualized container 720, and function 755 in virtual machine 750 in a sequence. A data stream in a data traffic flow associated with a second network slice can be processed by function 725 in virtualized container 720 and function 755 in virtual machine 750 in a sequence. Accordingly, a chain of services performed by the functions in service function chain 600 can be customized on a per data traffic flow basis reducing complexity and overhead in the network device (e.g., terminal 300).

Figure 7:
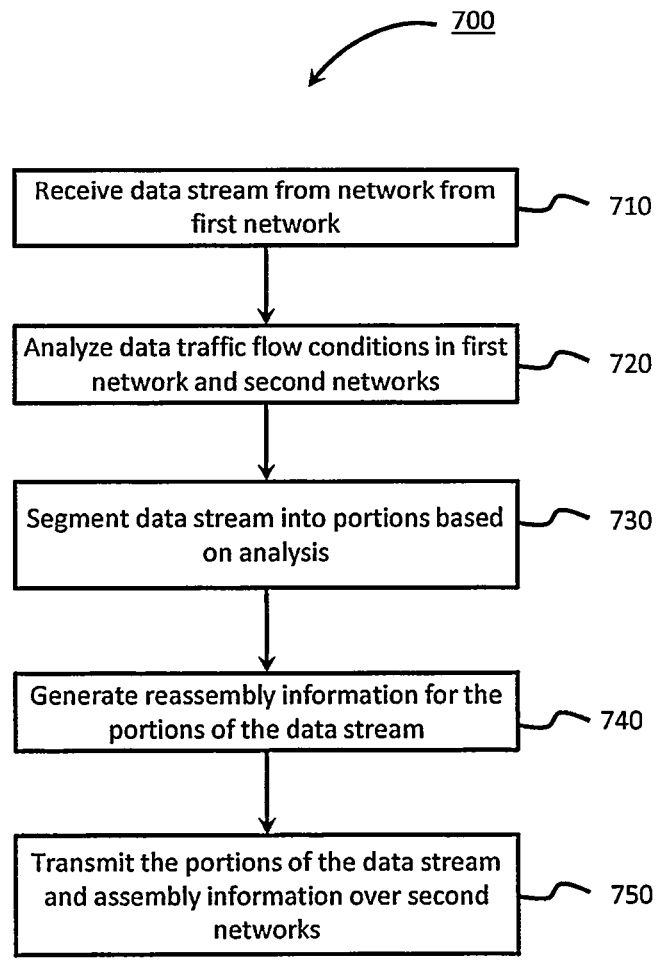
FIG. 7 is a flowchart of a process for processing data streams in a communication system, according to at least one embodiment.

FIG. 7 is a flowchart of a process 700 for processing data streams in a communication system, according to one or more embodiments. According to some embodiments, process 700 can be implemented as part of the operation of a gateway, such as gateway 220. Process 700 can equally be implemented as part of the operation of terminal 240 and/or terminal 250. According to some embodiments, process 700 can also be implemented in one or more elements in terminal 300 as described in FIG. 3. Further, according to some embodiments, one or more steps in process 700 can be configured as, or included in, one or more applications or functions implemented using NFV as part of SDN, such as data stream segmenting and reassembly structure 500.

At step 710, a data stream is received from a first network. According to some embodiments, the data stream can be received at the network interface 229. According to some embodiments, the first network can be a wired and/or wireless terrestrial network, such as a 5G network. The data stream can be provided from a network node in the first network, such as core network node 215 or BBU 245. According to some embodiments, the data stream can contain a plurality of data packets arranged in a sequence.

At step 720, traffic conditions are analyzed in the first network as well as a plurality of second networks. According to some embodiments, the analysis can include determining a value for at least one traffic flow condition (or traffic condition) in the first network, and determining at least one traffic condition in one or more of the plurality of second networks. Examples of traffic conditions include link delay, link error rate, data rate, queue depth, traffic latency, jitter, link condition, etc. According to at least one embodiment, the analysis can be performed in CPU 224. According to some embodiments, the traffic condition in the first network and/or the traffic condition in the second networks can be performed by other network devices, such as the core network node 215 or the NMS 290. According to some embodiments, the plurality of second networks can include one or more terrestrial networks; one or more of a low earth orbit (LEO) satellite network, a medium earth orbit (MEO) satellite network, and a geostationary orbit (GEO) satellite network; or any combination thereof.

At step 730, the received data stream is segmented into a first portion and at least one second portion based on the analysis of the traffic conditions. According to some embodiments, the segmenting includes comparing the results of analysis of traffic condition of the first network and the second networks, at step 720, to determine if the data stream should be segmented. According to at least one embodiment, a congestion analysis can be performed based on determining link delay. The data stream is segmented into the first portion and the at least one second portion if the link delay value determined for at least one of the plurality of second networks is lower than the link delay value determined for the first network. According to at least one embodiment, the analysis can also be used to determine how the data stream is segmented. For example, the segmenting can include generating a first data substream containing a first portion of data packets from the data stream. The segmenting can further include generating a second data sub stream containing a second or remaining portion of data packets from the data stream.

At step 740, reassembly information for the first portion of the data stream and the at least one second portion of the data stream is generated. According to some embodiments the reassembly information can include at least one data packet containing a packet sequence identifier which includes information associated with a relationship between sequence of data packets in the data stream and the sequence of data packets in the first data sub stream and the second data substream. At step 750, the first portion of the data stream, the at least one second portion of the data stream, and the reassembly information is transmitted from gateway 220 over one or more of the second networks. According to some embodiments, the reassembly information can be transmitted over the network in the plurality of second networks that has the lowest inherent latency (e.g., determined using RTT). According to some embodiments, one of the plurality of second networks can be a terrestrial network. Further, one of the at least one second portion of the data stream can be transmitted via the terrestrial network based on the analysis of the traffic conditions. The terrestrial network can be any kind of wired or wireless network that is available and can even be the first network. For example, gateway 220 can communicate the one second portion of the data stream to a network node, such as core network node 215, for transmission through the core network.

It is to be appreciated that one or more steps can be added to process 700 or deleted from process 700. Further, one or more steps in process 700 can be modified. According to some embodiments, step 750 can be modified to supply the reassembly information directly to the first network in addition to, or as an alternative to, transmitting over the second networks. The reassembly information can be provided to the first network, for example, by communicating it from gateway 220 to core network node 215. Core network node 215 can further communicate the reassembly information to BBU 245. In a similar manner, one of the second portions of the data stream can be provided to the first network in addition to, or as an alternative to, transmitting over the second networks.

Figure 8:
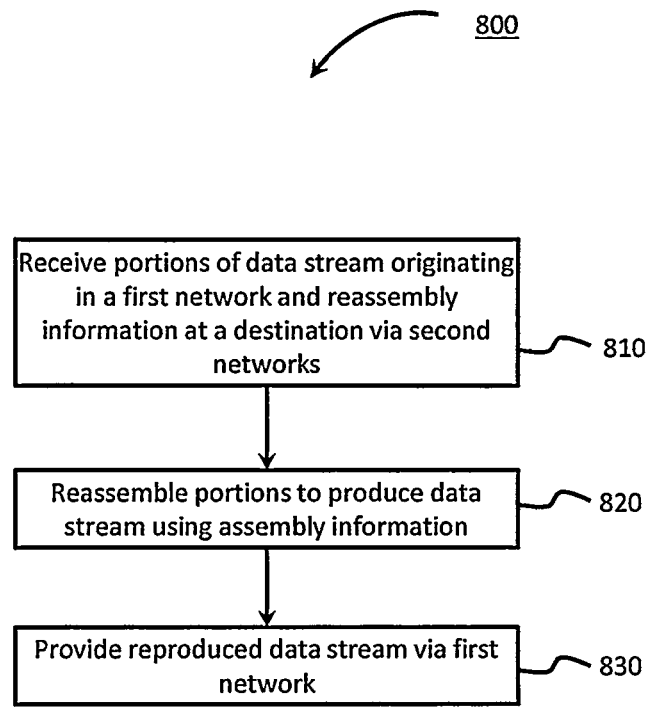
FIG. 8 is a flowchart illustrating steps for processing data streams in a communication system, according to one or more embodiments.

FIG. 8 is a flowchart of a process 800 illustrating steps for processing data streams in a communication system according to one or more embodiments. According to some embodiments, process 800 can be implemented as part of the operation of a terminal, such as terminal 300. Process 800 can equally be implemented as part of the operation of a gateway, such as gateway 220, terminal 240, or terminal 250. Further, according to some embodiments, one or more steps in process 800 can be configured as, or included in, one or more applications or functions implemented using NFV as part of SDN, such as data stream segmenting and reassembly structure 500.

At step 810, a set of data streams representing portions of a data stream originating in a first network are received at a destination via a plurality of second networks. Further, at step 810, reassembly information associated with the set of data streams is also received through RF receive unit 380 at the destination. The destination can be a terminal, such as terminal 240. According to some embodiments, the set of data streams can include a first data substream representing a first portion of the data stream originating in the first network, and at least one second data substream representing the remaining portions of the data stream originating in the first network. According to some embodiments, the set of data streams each contain a plurality of data packets arranged in a sequence. The reassembly information can also include at least one data packet containing a packet sequence identifier. The packet sequence identifier can include information associated with a relationship between the sequence of the data packets in the data stream originating in the first network and the sequence of data packets in the first data substream and the second data substream. According to some embodiments, the first network can include a core network, such as a 5G network. According to some embodiments, the plurality of second networks can include a low earth orbit (LEO) satellite network, a medium earth orbit (MEO) satellite network, a geostationary orbit (GEO) satellite network, or any combination thereof. According to some embodiments, the plurality of second networks can also include one or more wired terrestrial networks, and one or more wireless terrestrial networks. One or more of the set of data streams and/or the reassembly information can be received via one or more of the wired or wireless terrestrial networks. For example, one data stream from the set of data streams can be received at terminal 240 from the core network via BBU 245.

At step 820, the portions of the received data stream are reassembled to reproduce the data stream that originated in the first network. The reassembly can be based, for example, on the received reassembly information. According to some embodiments, the reassembly can include reassembling data packets from each one of the set of received data streams based on a relationship between the sequence of data packets in each one of the set of received data streams and the sequence of data packets in the data originating in the first network. The relationship can include a correspondence or mapping in the packet sequence identifier as part of the reassembly information.

At step 830, the reassembled data stream is provided via the first network. In some embodiments, the reassembled data stream is provided through network interface 340 to the first network. According to some embodiments, the terminal 300 can communicate the reassembled data stream to a network node in the first network, such as BBU 245 or RRUs 270, 275.

It is to be appreciated that one or more steps can be added to process 800 or deleted from process 800. Further, one or more steps in process 800 can be modified. According to some embodiments, step 810 can be modified to receive the reassembly information at the destination through network interface 340 via the first network in addition to, or as an alternative to, receiving it over one or more of the second networks. The reassembly information can be provided, for example, from BBU 245 via the core network. In a similar manner, one or more of the set of data streams can be received via the first or core network in addition to, or as an alternative to, receiving it over the second networks. According to further embodiments, one or more steps from process 700 can be combined with one or more steps from process 800 to form a process that receives a data stream at a gateway. The gateway segments the data stream into portions and communicates the portions over a plurality of second networks to a terminal, such as terminal 240. The terminal reassembles the portion in the data stream and provides the data stream back to the first network.

Figure 9:
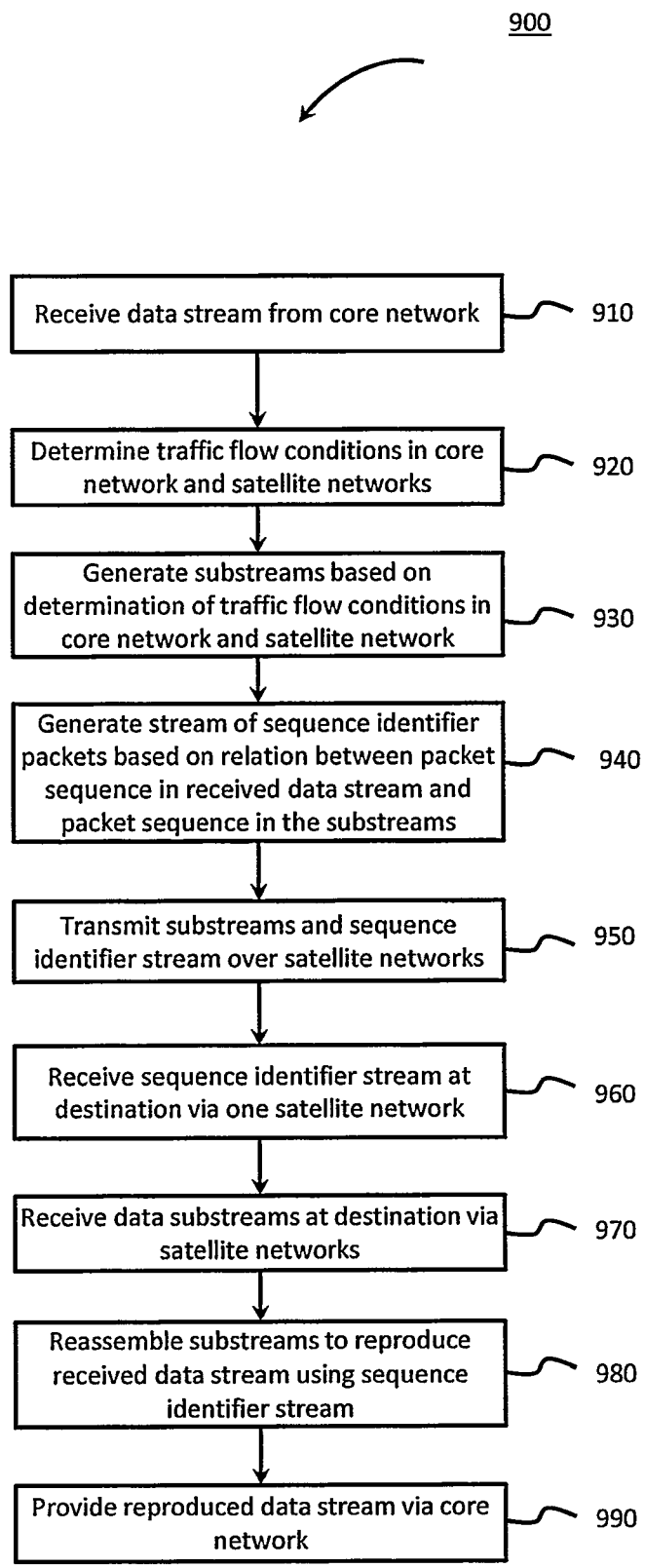
FIG. 9 is a flowchart for processing data streams in a communication system, according to various embodiments.

FIG. 9 is a flowchart of a process 900 for processing data streams in a communication system according to one or more embodiments. According to some embodiments, process 800 can be implemented as part of the operation of devices included in a communication system that includes a plurality of coordinated networks, such as communication system 200. Accordingly, all or a portion of process 900 can be implemented in one or more network devices in communication system 200, such as gateway 220, terminal 240, terminal 250, and RRUs 270 and 275. According to some embodiments, process 900 can also be implemented in one or more elements of terminal 300. Further, according to some embodiments, one or more steps in process 900 can be configured as, or included in, one or more applications or functions implemented using NFV as part of SDN, such as data stream segmenting and reassembly structure 500.

At step 910, a data stream is received from the core network. The data stream can include a plurality of data packets in a sequence. Further, each one of the data packets can include a packet identifier. According to some embodiments the data stream can be received at gateway 220 from core network node 215 as part of the backhaul network discussed previously. At step 920, one or more traffic conditions are determined for the core network and a plurality of satellite networks. According to some embodiments, the plurality of satellite networks can include a LEO satellite network that utilizes satellite 230 and a GEO satellite network that utilizes satellite 235. According to some embodiments, the analysis can include determining at least one traffic condition in the core network and determining the same traffic condition(s) in at least one of the plurality of satellite networks. According to one embodiment, the traffic condition(s) can include link delay, link error rate, data rate, queue depth, traffic latency, jitter, link condition, etc. According to some embodiments, the traffic conditions can be determined by the gateway 220. According to other embodiments, the traffic conditions in the first network can be determined by a network device within the core network. The results determined by the network device can subsequently be communicated directly to gateway 220 or indirectly via NMS 290.

At step 930, the data stream is segmented into a set of data substreams based on the determination of traffic condition(s), at step 920. According to some embodiments, the set of sub streams includes a first data sub stream containing a first portion of data packets from the data stream and a second data sub stream containing a second portion of data packets from the data stream. Further, the sequence of data packets in the first data sub stream and the second data substream is not the same as the sequence of packets in the received data stream, at step 910. According to some embodiments, the segmenting can be performed when a traffic condition for at least one of the satellite networks is determined to be better than the same traffic condition for the core network. According to some embodiments, the data stream can be segmented, either statically or dynamically, into data substreams at a different apportioning rate. According to some embodiments, each of the data packets in the set of data substreams can include unique packet identifiers that are different from the packet identifiers for the data packets included in the data stream received from the core network at step 910. According to some embodiments, the data stream can be segmented using a virtualized application such as the application for the network traffic routing multipath service discussed previously.

At step 940, a sequence identifier stream that includes one or more sequentially arranged data packets is generated. The one or more data packets include information identifying a relationship between the received data stream and the set of substreams. According to at least one embodiment, the one or more data packets each contain a packet identifier for one of the data packets in the received data stream and the packet identifier for the corresponding data packet that is in one of the set of data substreams. At step 950, the set of data substreams and the sequence identifier stream are transmitted over alternate networks, such as the plurality of satellite networks. According to some embodiments, the set of data substreams can be transmitted via one or both of satellite 230 and satellite 235 using RFT 222. Further, the sequence identifier stream can be transmitted via one of satellite 230 and satellite 235. According to one or more embodiments, the timing for transmission of one or more of the data streams or the sequence identifier stream can be adjusted in relation to the transmission of the other substreams.

At step 960, the sequence identifier stream is received at a destination location via one of the plurality of second networks. At step 970, the set of data sub streams is received at the destination location via the plurality of second networks. According to some embodiments, this can correspond to the sequence identifier stream and the set of data streams being received by terminal 240 at the destination location as part of the backhaul network. At step 980, the set of data substreams are reassembled to reproduce the data stream received from the core network. The reassembly can be based, for example, on information included in the received sequence identifier stream. According to at least one embodiment, the reassembly can include identifying and placing each one of the data packets in the set of data sub streams in sequence order based on the mapping of packet identifiers for data packets in the data stream received from the core network and the corresponding packet identifiers for data packets in the set substreams. At step 990, the reassembled data stream is provided to one or more network devices in the core network. According to some embodiments, the reassembled data stream can be transmitted or communicated to BBU 245.

It is to be appreciated that one or more steps can be added to or deleted from process 700 and one or more steps in process 700 can be modified such as described in FIG. 7 and FIG. 8. According to some embodiments, one or more steps of process 900 can be modified to communicate one of the set of data substreams and or the sequence identifier stream over the core network as described in FIG. 7 and FIG. 8. Although process 900 has been described with respect to outroute communication in the backhaul network of communication system 200, various embodiments facilitate its application to inroute communication in the backhaul network. Further, according to some embodiments, process 900 can be applied to outroute and/or inroute communication in the fronthaul network of communication 200. For example, process 900 can be performed by terminal 250 transmitting a set of data substreams over a plurality of satellite networks via satellites 260 and 265 to RRUs 270 and 275 to provide a reproduced data stream to UEs 280 and/or 285.

Various features described herein can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program can be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors can be contained on a single unitary IC die, or distributed across multiple components. Such exemplary hardware for implementing the described features is detailed below.

Figure 10:
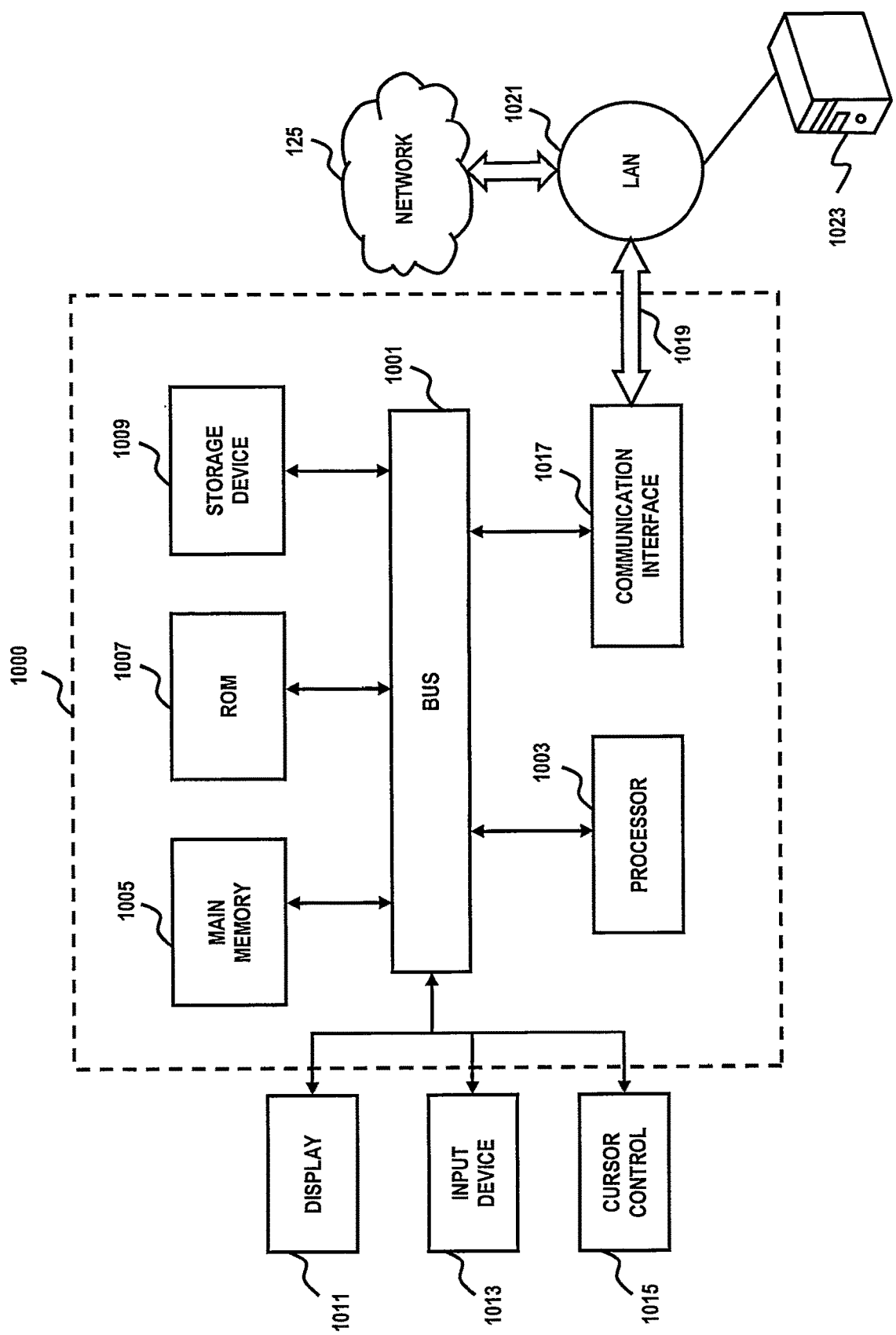
FIG. 10 is a diagram of a computer system that can be used to implement various exemplary features and embodiments.

FIG. 10 is a diagram of a computer system that can be used to implement features of various embodiments. The computer system 1000 includes a bus 1001 or other communication mechanism for communicating information and a processor 1003 coupled to the bus 1001 for processing information. The computer system 1000 also includes main memory 1005, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1001 for storing information and instructions to be executed by the processor 1003. Main memory 1005 can also be used for storing temporary variables or other intermediate information during execution of instructions by the processor 1003. The computer system 1000 can further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 can be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order to facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1405 from another computer-readable medium, such as the storage device 1009. Execution of the arrangement of instructions contained in main memory 1005 causes the processor 1403 to perform the process steps described herein. One or more processors in a multi-processing arrangement can also be employed to execute the instructions contained in main memory 1005. In alternative embodiments, hard-wired circuitry can be used in place of or in combination with software instructions to implement exemplary embodiments. Thus, exemplary embodiments are not limited to any specific combination of hardware circuitry and software.

The computer system 1000 also includes a communication interface 1017 coupled to bus 1401. The communication interface 1017 provides a two-way data communication coupling to a network link 1019 connected to a local network 1021. For example, the communication interface 1017 can be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1017 can be a local area network (LAN) card (e.g., for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 can provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 can execute the transmitted code while being received and/or store the code in the storage device 1009, or other non-volatile storage for later execution. In this manner, the computer system 1000 can obtain application code in the form of a carrier wave.

The term "computer-readable medium" as used herein refers to any medium that participates in providing instructions to the processor 1003 for execution. Such a medium can take many forms, including but not limited to non-volatile media, volatile media, and transmission media. Non-volatile media include, for example, optical or magnetic disks, such as the storage device 1009. Non-volatile media can further include flash drives, USB drives, microSD cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 11:
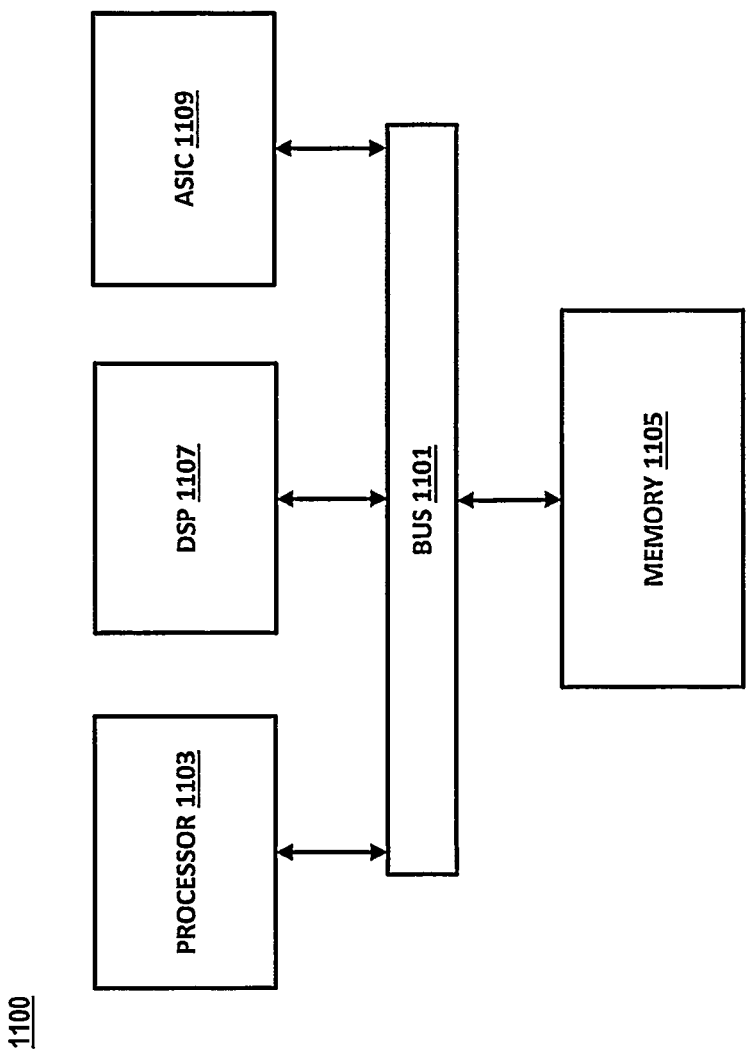
FIG. 11 is a diagram of a chip set that can be used to implement various exemplary features and embodiments.

FIG. 11 illustrates a chip set 1100 upon which features of various embodiments can be implemented. Chip set 1100 is programmed to implement various features as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 can include one or more processing cores with each core configured to perform independently. A multi-core processor enables multiprocessing within a single physical package. Examples of a multi-core processor include two, four, eight, or greater numbers of processing cores. Alternatively, or in addition, the processor 1103 can include one or more microprocessors configured in tandem via the bus 1101 to enable independent execution of instructions, pipelining, and multithreading. The processor 1103 can also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, rewritable optical disk, etc.) and static memory (e.g., ROM, CD-ROM, DVD, BLU-RAY disk, etc.) for storing executable instructions that when executed perform the inventive steps described herein. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving a data stream from a first network;
   analyzing traffic conditions in the first network and a plurality of second networks;
   segmenting the data stream into a first portion and at least one second portion based on the analysis of the traffic conditions;
   generating reassembly information for the first portion of the data stream and the at least one second portion of the data stream;
   transmitting the first portion of the data stream, the at least one second portion of the data stream, and the reassembly information over the plurality of second networks;
   receiving the reassembly information at a destination via one of the plurality of second networks;
   receiving the first portion of the data stream and the at least one second portion of the data stream at the destination via the plurality of second networks;
   reassembling the first portion and the at least one second portion of the data stream, based on the received reassembly information, to reproduce the data stream received from the first network; and
   providing the reassembled data stream via the first network; and
   wherein the traffic conditions include link delay, and wherein the segmenting the data stream further comprises segmenting the data stream into the first portion and the at least one second portion if a link delay value determined for at least one of the plurality of second networks is lower than a link delay value determined for the first network.

2. The method of claim 1, wherein the data stream contains a plurality of data packets, and wherein the segmenting the data stream includes generating a first data substream containing a first portion of data packets from the data stream and a second data substream containing a second portion of data packets from the data stream.

3. The method of claim 2, wherein the reassembly information includes at least one data packet containing a packet sequence identifier, the packet sequence identifier including information associated with a relationship between sequence of data packets in the data stream and the sequence of data packets in the first data substream and the second data substream.

4. The method of claim 1, wherein the first network is a terrestrial network.

5. The method of claim 4, wherein the terrestrial network is a 5G network.

6. The method of claim 1, wherein the plurality of second network includes at least one of a low earth orbit (LEO) satellite network, a medium earth orbit (MEO) satellite network, and a geostationary orbit (GEO) satellite network.

7. The method of claim 1, wherein the traffic conditions include at least one of link delay, link error rate, data rate, queue depth, traffic latency, jitter, and link condition.

8. The method of claim 1, wherein one of the plurality of second networks includes a terrestrial network and the method further comprises:
   transmitting one of the at least one second portion of the data stream and the reassembly information over the one of the plurality of the plurality of networks based on the analyzed traffic conditions; and
   receiving the at least one second portion of the data and reassembly information at the destination via the one of the plurality of second networks.

9. A system comprising:
   a plurality of network nodes of a first network;
   a gateway configured to establish a communication link with one of the plurality of network nodes; and
   a terminal configured to establish a communication link with the gateway over a plurality of second networks,
   wherein the gateway is further configured to:
      receive a data stream from the one of the plurality of network nodes in the first network;
      analyze a traffic condition in the first network and the plurality of second networks;
      segment the data stream into a first portion and at least one second portion based on the analysis of the at least one traffic condition;
      generate reassembly information for the first portion of the data stream and the at least one second portion of the data stream; and
      transmit the first portion of the data stream, the at least one second portion of the data stream, and the reassembly information over the plurality of second networks, and
   wherein the traffic conditions include link delay, and wherein the segmenting the data stream further comprises segmenting the data stream into the first portion and the at least one second portion if a link delay value determined for at least one of the plurality of second networks is lower than a link delay value determined for the first network; and
   wherein the terminal is further configured to:
      receive the reassembly information at a destination via one of the plurality of second networks;
      receive the first portion of the data stream and the at least one second portion of the data stream at the destination via the plurality of second networks;
      reassemble the first portion and the at least one second portion of the data stream, based on the received reassembly information, to reproduce the data stream received by the gateway from the first network; and
      provide the reassembled data stream via a different one of the connecting nodes in the first network.

10. The system of claim 9, wherein the data stream contains a plurality of data packets and wherein the gateway is further configured to segment the data stream by generating a first data substream containing a first portion of data packets from the data stream and a second data substream containing a second portion of data packets from the data stream.

11. The system of claim 9, wherein the reassembly information includes at least one data packet containing a packet sequence identifier, the packet sequence identifier including information associated with a relationship between sequence of data packets in the data stream and the sequence of data packets in the first data substream and the second data substream.

12. The system of claim 9, wherein the first network is a terrestrial network.

13. The system of claim 12, wherein the terrestrial network is a 5G network.

14. The system of claim 9, wherein the plurality of second networks includes at least one of a low earth orbit (LEO) satellite network, a medium earth orbit (MEO) satellite network, and a geostationary orbit (GEO) satellite network.

15. The system of claim 9, wherein:
   one of the plurality of second networks includes a terrestrial network;
   the gateway is further configured to transmit one of the at least one second portion of the data stream and the reassembly information over the one of the plurality of the plurality of networks based on the analyzed traffic conditions; and
   the terminal is further configured to receive the at least one second portion of the data and reassembly information at the destination via the one of the plurality of second network.

16. The system of claim 9, wherein the plurality network nodes includes at least one of a core network node, a baseband unit, and remote radio unit.

17. The system of claim 9, wherein at least one of the gateway and the terminal is configured to implement applications utilizing network function virtualization as part of software defined networking.

18. The system of claim 17, wherein network slicing is applied in the first network and the plurality of second networks to accommodate different network functions for a plurality of network operators.

* * * * *